United States Patent
Hao et al.

(10) Patent No.: US 10,539,722 B2
(45) Date of Patent: Jan. 21, 2020

(54) OPTICAL FILM

(75) Inventors: Encai Hao, Woodbury, MN (US); William Blake Kolb, West Lakeland, MN (US); Brant U. Kolb, Afton, MN (US); Brian W. Ostlie, Hudson, WI (US); Naiyong Jing, Woodbury, MN (US); Michael Benton Free, St. Paul, MN (US); Hui Ren, Woodbury, MN (US); Robert L. Brott, Woodbury, MN (US); Fei Lu, Woodbury, MN (US); Audrey A. Sherman, St. Paul, MN (US); Scott M. Tapio, Falcon Heights, MN (US); Charles David Hoyle, Stillwater, MN (US); John A. Wheatley, Lake Elmo, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1225 days.

(21) Appl. No.: 13/264,325

(22) PCT Filed: Apr. 14, 2010

(86) PCT No.: PCT/US2010/031010
§ 371 (c)(1),
(2), (4) Date: Oct. 13, 2011

(87) PCT Pub. No.: WO2010/120864
PCT Pub. Date: Oct. 21, 2010

(65) Prior Publication Data
US 2012/0038990 A1 Feb. 16, 2012

(51) Int. Cl.
*G02B 5/02* (2006.01)

(52) U.S. Cl.
CPC ........ *G02B 5/0247* (2013.01); *G02B 5/0242* (2013.01); *G02B 5/0268* (2013.01); *G02B 5/0278* (2013.01); *H01J 2211/44* (2013.01); *Y10T 428/249921* (2015.04); *Y10T 428/249953* (2015.04); *Y10T 428/25* (2015.01)

(58) Field of Classification Search
CPC .............. G02B 5/02–5/0294; G02B 1/10–1/18
USPC ........................................ 359/599, 601, 613
See application file for complete search history.

(56) References Cited

U.S. PATENT DOCUMENTS

| 2,736,721 A | 2/1956 | Dexter |
| 2,801,185 A | 7/1957 | Iler |

(Continued)

FOREIGN PATENT DOCUMENTS

| DE | 10-2007-063471 | 12/2008 |
| EP | 989443 | 3/2000 |

(Continued)

OTHER PUBLICATIONS

ASTM Designation: D 1003-00, "Standard Test Method for Haze and Luminous Transmittance of Transparent Plastics", 2000, pp. 198-203.

(Continued)

*Primary Examiner* — Bumsuk Won
*Assistant Examiner* — Jeffrey E Madonna
(74) *Attorney, Agent, or Firm* — Robert S. Moshrefzadeh; Lisa P. Fulton

(57) ABSTRACT

Optical film is disclosed. The optical film includes a binder, a plurality of particles, and a plurality of interconnected voids. The volume fraction of the plurality of interconnected voids in the optical film is not less than about 20%. The weight ratio of the binder to the plurality of the particles is not less than about 1:2.

70 Claims, 24 Drawing Sheets

(56) References Cited

U.S. PATENT DOCUMENTS

| | | | |
|---|---|---|---|
| 2,976,576 A | 3/1961 | Wichterle | |
| 4,127,693 A * | 11/1978 | Lemelson | 428/163 |
| 4,379,201 A | 4/1983 | Heilmann | |
| 4,522,958 A | 6/1985 | Das | |
| 4,672,089 A | 6/1987 | Pricone | |
| 4,696,719 A | 9/1987 | Bischoff | |
| 4,737,559 A | 4/1988 | Kellen | |
| 4,842,893 A | 6/1989 | Yializis | |
| 4,889,632 A | 12/1989 | Svec | |
| 4,923,610 A | 5/1990 | Svec | |
| 4,952,349 A | 8/1990 | Svec | |
| 4,954,371 A | 9/1990 | Yializis | |
| 5,130,343 A | 7/1992 | Frechet | |
| 5,214,119 A | 5/1993 | Leir | |
| 5,219,120 A | 6/1993 | Ehrenberg | |
| 5,261,949 A | 11/1993 | Schilling | |
| 5,413,853 A | 5/1995 | Imashiro | |
| 5,593,729 A | 1/1997 | Frechet | |
| 5,633,290 A | 5/1997 | Frechet | |
| 5,677,050 A | 10/1997 | Bilkadi | |
| 5,691,846 A | 11/1997 | Benson, Jr. | |
| 5,694,701 A | 12/1997 | Huelsman | |
| 5,728,457 A | 3/1998 | Frechet | |
| 5,808,713 A | 9/1998 | Broer | |
| 5,919,555 A | 7/1999 | Yasuda | |
| 5,992,066 A | 11/1999 | Brauer | |
| 6,012,647 A | 1/2000 | Ruta | |
| 6,090,861 A | 7/2000 | Mendenhall et al. | |
| 6,111,699 A * | 8/2000 | Iwata | G02B 5/0221 |
| | | | 359/599 |
| 6,166,855 A | 12/2000 | Ikeyama | |
| 6,177,131 B1 | 1/2001 | Glaubitt | |
| 6,204,202 B1 | 3/2001 | Leung | |
| 6,208,466 B1 | 3/2001 | Liu | |
| 6,210,485 B1 | 4/2001 | Zhao | |
| 6,210,858 B1 | 4/2001 | Yasuda | |
| 6,245,150 B1 | 6/2001 | Lyons | |
| 6,256,146 B1 * | 7/2001 | Merrill | G02B 5/3008 |
| | | | 252/585 |
| 6,368,699 B1 | 4/2002 | Gilbert | |
| 6,383,559 B1 | 5/2002 | Nakamura | |
| 6,413,882 B1 | 7/2002 | Leung | |
| 6,457,823 B1 | 10/2002 | Cleary | |
| 6,521,047 B1 | 2/2003 | Brutii | |
| 6,573,305 B1 | 6/2003 | Thunhorst | |
| 6,683,421 B1 | 1/2004 | Kennedy | |
| 6,703,463 B2 | 3/2004 | Holguin | |
| 6,759,080 B2 | 7/2004 | Thunhorst | |
| 6,797,396 B1 | 9/2004 | Liu | |
| 6,846,089 B2 | 1/2005 | Stevenson | |
| 6,890,642 B2 | 5/2005 | Kaminsky | |
| 6,924,014 B2 | 8/2005 | Ouderkirk | |
| 6,958,860 B2 | 10/2005 | Dontula | |
| 7,032,324 B2 | 4/2006 | Kolb | |
| 7,099,083 B2 | 8/2006 | Johnson | |
| 7,108,810 B2 | 9/2006 | Nakamura | |
| 7,132,136 B2 | 11/2006 | Laney | |
| 7,137,696 B2 | 11/2006 | Siegel | |
| 7,185,993 B2 | 3/2007 | Smith | |
| 7,204,616 B2 | 4/2007 | Kitamura | |
| 7,241,478 B2 | 7/2007 | McNeish | |
| 7,309,135 B2 | 12/2007 | Smith | |
| 7,327,415 B2 | 2/2008 | Brickey | |
| 7,361,474 B2 | 4/2008 | Siegler | |
| 7,371,464 B2 | 5/2008 | Sherman | |
| 7,372,075 B2 | 5/2008 | Shigemura | |
| 7,431,888 B2 | 10/2008 | Frechet | |
| 7,466,373 B2 | 12/2008 | Xu | |
| 7,547,105 B2 | 6/2009 | Bacon | |
| 2002/0014090 A1 | 2/2002 | Tsujino | |
| 2003/0116270 A1 | 6/2003 | Hawa | |
| 2003/0138555 A1 | 7/2003 | Debe | |
| 2003/0148024 A1 | 8/2003 | Kodas | |
| 2003/0170442 A1 | 9/2003 | Kaminsky | |
| 2004/0164325 A1 | 8/2004 | Siegel | |
| 2005/0116179 A1 | 6/2005 | Aguirre | |
| 2005/0214453 A1 | 9/2005 | Kawanishi | |
| 2005/0261389 A1 | 11/2005 | Bratolaysky | |
| 2006/0014012 A1 | 1/2006 | Thies | |
| 2006/0019114 A1 | 1/2006 | Thies | |
| 2006/0082700 A1 | 4/2006 | Gehlsen | |
| 2006/0093786 A1 | 5/2006 | Ohashi | |
| 2006/0246233 A1 | 11/2006 | Fukuda | |
| 2006/0275595 A1 | 12/2006 | Thies | |
| 2007/0020404 A1 | 1/2007 | Seiberle | |
| 2007/0065638 A1 | 3/2007 | Wang | |
| 2007/0110983 A1 | 5/2007 | Jahromi | |
| 2007/0134939 A1 | 6/2007 | Brueck | |
| 2007/0189038 A1 | 8/2007 | Pokorny | |
| 2007/0286993 A1 | 12/2007 | Radcliffe | |
| 2008/0037127 A1 | 2/2008 | Weber | |
| 2008/0080055 A1 | 4/2008 | Lightfoot | |
| 2008/0192352 A1 | 8/2008 | Laney | |
| 2008/0214075 A1 | 9/2008 | Marte | |
| 2008/0220554 A1 | 9/2008 | Shigemura | |
| 2008/0248312 A1 | 10/2008 | Thies | |
| 2008/0305282 A1 | 12/2008 | Inakura | |
| 2009/0029145 A1 | 1/2009 | Thies | |
| 2009/0074976 A1 | 3/2009 | Freking | |
| 2009/0191406 A1 | 7/2009 | Yoneda | |
| 2010/0091374 A1 * | 4/2010 | Iwata et al. | 359/599 |
| 2010/0195313 A1 * | 8/2010 | Hiraishi | G02B 5/0242 |
| | | | 362/97.1 |
| 2010/0238384 A1 * | 9/2010 | Tochigi | G02B 5/0226 |
| | | | 349/96 |
| 2011/0284907 A1 * | 11/2011 | Nakamura | H01L 51/5268 |
| | | | 257/98 |
| 2012/0039089 A1 | 2/2012 | Hao | |
| 2012/0200919 A1 * | 8/2012 | Petaja et al. | 359/483.01 |
| 2012/0200931 A1 * | 8/2012 | Haag | G02B 5/0247 |
| | | | 359/599 |

FOREIGN PATENT DOCUMENTS

| | | |
|---|---|---|
| EP | 1002830 | 5/2000 |
| EP | 1022587 | 6/2007 |
| EP | 1479734 | 2/2009 |
| GB | 1188736 | 4/1970 |
| JP | 11-281802 | 10/1999 |
| JP | 2001-154188 | 6/2001 |
| JP | 2005-246962 | 9/2005 |
| JP | 2005-266343 | 9/2005 |
| JP | 2008-003243 | 1/2008 |
| JP | 2008-062599 | 3/2008 |
| JP | 2009-082890 | 4/2009 |
| WO | WO 2001-04954 | 1/2001 |
| WO | WO 2003-064304 | 8/2003 |
| WO | WO 2004-026783 | 4/2004 |
| WO | WO 2006-031102 | 3/2006 |
| WO | WO 2006-096258 | 9/2006 |
| WO | WO 2007-031539 | 3/2007 |
| WO | WO 2007-031541 | 3/2007 |
| WO | WO 2007-065847 | 6/2007 |
| WO | WO 2007-146722 | 12/2007 |
| WO | WO 2008-011919 | 1/2008 |
| WO | WO 2010-120422 | 10/2010 |
| WO | WO 2010-120845 | 10/2010 |
| WO | WO 2010-120864 | 10/2010 |
| WO | WO 2010-120971 | 10/2010 |
| WO | WO 2010-121019 | 10/2010 |
| WO | WO 2011-050254 | 4/2011 |

OTHER PUBLICATIONS

Bakry, "Monolithic Porous Polymer Layer for the Separation of Peptides and Proteins using thin layer chromatography coupled with MALDI-TOF-MS", Anal. Chem. Jan. 15, 2007, vol. 79, pp. 486-493.

Dulay, "Photopolymerized Sol-Gel Monoliths for Capillary Electrochromotography", Anal. Chem., Aug. 15, 2001, vol. 73, No. 16, pp. 3921-3926.

(56) References Cited

OTHER PUBLICATIONS

IBN-Elhaj, Nature, "Optical polymer thin films with isotropic and anisotropic nano-corrugated surface topologies", Letters of Nature, Apr. 12, 2011, vol. 410, pp. 796-799.
Kemsley, "Modernizing TLC, New instrumentation, materials, and analysis techniques take lab staple into high-performance arena", C&EN, May 18, 2009, vol. 87, No. 20, pp. 11-18.
Oliveri, "Fabrication and Characterization of Polymeric Optical Waveguides Using Standard Silicon Processing Technology", Fibres and Optical Passive Components, Proceedings of 2005/IEEE/LEOS Workshop on Jun. 22-24, 2005, pp. 1-6.
Peng, "Enhanced coupling of light from organic light emitting diodes using nanoporous films", Journal of Applied Physics,Aug. 1, 2004, vol. 96, No. 3, pp. 1649-1654.
Rohr, "Photografting and the Control of Surface Chemistry in Three-Dimensional Porous Polymer Monoliths", Macromolecules, 2003, vol. 36, No. 5, pp. 1677-1684.
Schmidt, "Templated Cross-Linking Reactions for Designing NanoPorous Materials", Materials & Science Engineering, 2007, vol. C 27, No. 5-8 pp. 1487-1490.
Svec , "Monolithic materials promises, challenges, achievements", Analytical Chemistry, Apr. 1, 2006, pp. 2101-2107.
Tennikova, "High performance membrane chromoatography of proteins. A novel method of protein separation", J. Choromatography, 1991, vol. 555, pp. 97-107.
Tennikova, "High performance membrane chromoatography. A novel method of protein separation", J. Liquid Choromatography, 1990, vol. 13, No. 1, pp. 63-70.
Tsutsui, "Doubling Coupling-Out Efficiency in Organic Light-Emitting Devices Using a Thin Silica Aerogel Layer", Advanced Materials, Aug. 3, 2001, vol. 13, No. 15, pp. 1149-1152.
Viklund, "Molded" macroorous poly(glycidyl methacrylate-co-trimethylolpropane trimethacrylate) materials with fine controlled porous properties: preparation on monoliths using photoinitiated polymerization, Chem. Mater., 1997, vol. 9, No. 2, pp. 463-471.
Walheim , "NanoPhase-Seperated Polymer Films as High-Performance AntiReflection Coatings", Science, Jan. 22, 1999, vol. 283, pp. 520-522.
Wang, "Formation of porous epoxy monolith via concentrated emulsion polymerization", J. Colloid and Interface Science, 2008, vol. 325, pp. 453-458.
Yu, "Preparation of Monolithic Polymers with Controlled Porous Properties for Microfluidic Chip Applications Using Photoinitiated Free-Radical Polymerization", Journal of Polymer Science, 2002, vol. 40, No. 6, pp. 755-769.
International Search Report for PCT/US2010/028777, dated Aug. 16, 2010, 4 pages.
Written Opinion for PCT/US2010/028777, 8 pages.
International Search Report for PCT/US2010/031010, dated Aug. 17, 2010, 8 pages.
Written Opinion for PCT/US2010/031010, 12 pages.
International Search Report for PCT/US2010/027433, dated Sep. 1, 2010, 8 pages.
Written Opinion for PCT/US2010/027433, 15 pages.
U.S. Appl. No. 61/013,617, filed Dec. 13, 2007, entitled Hydrophilic Gel Materials and Methods of Making the Same by Non-contact Deposition.
U.S. Appl. No. 61/169,427, filed Apr. 15, 2009, entitled Process and Apparatus for Coating with Reduced Defects.
U.S. Appl. No. 61/169,429, filed Apr. 15, 2009, entitled Process and Apparatus for a Nanovioided Article.
U.S. Appl. No. 61/169,466, filed Apr. 15, 2009, entitled Optical Film.
U.S. Appl. No. 61/169,521, filed Apr. 15, 2009, entitled Optical Construction and Display System Incorporating Same.
U.S. Appl. No. 61/169,532, filed Apr. 15, 2009 entitled Retroreflecting Optical Construction.
U.S. Appl. No. 61/169,549, filed Apr. 15, 2009 entitled Optical Film for Preventing Optical Coupling.
U.S. Appl. No. 61/169,555, filed Apr. 15, 2009, entitled Backlight and Display System Incorporating Same.
U.S. Appl. No. 61/294,600, filed Jan. 13, 2010, entitled Microstructured Low Refractive Index Articles.

* cited by examiner

OPTICAL FILM

CROSS REFERENCE TO RELATED APPLICATIONS

This application is a national stage filing under 35 U.S.C. 371 of PCT/US2010/031010, filed on Apr. 14, 2010, which claims priority to U.S. Provisional Application No. 61/169,466, filed on Apr. 15, 2009, the disclosure of which is incorporated by reference in its/their entirety herein.

RELATED APPLICATIONS

This application is related to the following U.S. patent applications which are incorporated by reference: U.S. Provisional Application No. 61/169,521, titled "Optical Construction and Display System Incorporating Same"; U.S. Provisional Application No. 61/169,532, titled "Retroreflecting Optical Construction"; U.S. Provisional Application No. 61/169,549, titled "Optical Film for Preventing Optical Coupling"; U.S. Provisional Application No. 61/169,555, titled "Backlight and Display System Incorporating Same"; U.S. Provisional Application No. 61/169,427, titled "Process and Apparatus for Coating with Reduced Defects"; and U.S. Provisional Application No. 61/169,429, titled "Process and Apparatus for a Nanovoided Article".

FIELD OF THE INVENTION

This invention generally relates to optical films that exhibit some low-refractive index-like properties. The invention is further applicable to optical systems, such as display systems incorporating such optical films.

BACKGROUND

Optical systems, such as retroreflecting or display systems, utilize one or more optical layers for managing incident light. Often, the optical layers are required to have a desired optical transmittance, optical haze, optical clarity, and index of refraction. In many applications, an air layer and a diffuser layer are incorporated into the optical system. Typically, the air layer supports total internal reflection and the diffuser layer provides optical diffusion.

SUMMARY OF THE INVENTION

Generally, the present invention relates to optical films. In one embodiment, an optical film includes a binder, a plurality of particles, and a plurality of interconnected voids. The volume fraction of the plurality of interconnected voids in the optical film is not less than about 20%. The weight ratio of the binder to the plurality of the particles is not less than about 1:2. In some cases, at least some of the plurality of particles include reactive groups that are chemically bound to the binder. In some cases, at least some of the plurality of particles do not include reactive groups. In some cases, the plurality of particles include elongated or spherical particles. In some cases, the volume fraction of the plurality of interconnected voids in the optical film is not less than about 50%. In some cases, the weight ratio of the binder to the plurality of the particles is not less than about 2:1. In some cases, the effective index of the optical film is not greater than about 1.35, or not greater than about 1.25, or not greater than about 1.2, or not greater than about 1.15. In some cases, the optical haze of the optical film is not greater than about 5%, or not greater than about 2%, or not greater than about 1%. In some cases, the optical haze of the optical film is not less than about 50%, or not less than about 70%, or not less than about 90%. In some cases, the optical clarity of the optical film is not greater than about 10%, or not greater than about 2%. In some cases, the optical clarity of the optical film is not less than about 50%, or not less than about 70%, or not less than about 90%. In some cases, the thickness of the optical film is not less than about 1 micron, or not less than about 2 microns.

In some cases, the optical film has an optical haze that is not less than about 80%. In such cases, light scattered by the optical film for normally incident light has a luminance $L_1$ at zero degrees and a luminance $L_2$ at 10 degrees. $L_1/L_2$ is not less than about 10, or not less than about 20, or not less than about 50, or not less than about 100. In some cases, the optical haze is not less than about 90%.

In another embodiment, an optical film includes a binder, a plurality of elongated particles, and a plurality of interconnected voids. The volume fraction of the plurality of interconnected voids in the optical film is not less than about 20%. The thickness of the optical film is not less than about 1 micron. The optical haze of the optical film is not greater than about 1.5%. In some cases, the elongated particles in the plurality of elongated particles have an average aspect ratio that is not less than about 2, or not less than about 3, or not less than about 4. In some cases, the volume fraction of the plurality of interconnected voids in the optical film is not less than about 40%. In some cases, the thickness of the optical film is not less than about 1.5 microns, or not less than about 2 microns, or not less than about 2.5 microns.

In another embodiment, an optical film includes a plurality of interconnected porous clusters. Each cluster includes a plurality of particles, a binder that coats and interconnects the plurality of the particles, and a first plurality of voids dispersed between the plurality of particles, and a second plurality of voids dispersed between the plurality of the interconnected porous clusters. In some cases, the voids in the first plurality of voids have an average size that is less than about 50 nm, or less than about 40 nm, or less than about 30 nm. In some cases, the voids in the second plurality of voids have an average size that is in a range from about 50 nm to about 700 nm, or in a range from about 100 nm to about 500 nm. In some cases, the particles in the plurality of particles have an average size that is less than about 100 nm, or less than about 50 nm. In some cases, the clusters in the plurality of interconnected porous clusters have an average size that is less than about 1500 nm, or less than about 1000 nm. In some cases, the optical haze of the optical film is greater than about 50% and the optical clarity of the optical film is greater than about 50%.

In some cases, the optical film has a thickness that is greater than about 1 micron, or greater than about 2 microns.

In another embodiment, an optical film includes a plurality of interconnected porous clusters. Each cluster includes a plurality of particles and a binder. The optical film has a thickness that is greater than about 1 micron, and optical haze that is greater than about 50%, and an optical clarity that is greater than about 50%.

In another embodiment, an optical volume diffuser includes a plurality of particles that are dispersed throughout the volume optical diffuser, and a plurality of voids that are dispersed throughout the volume optical diffuser. The optical film has an optical haze and an optical clarity, each of which is not less than about 50%. In some cases, the voids in the plurality of voids are interconnected. In some cases, each of the optical haze and the optical clarity is not less than about 70%, or not less than about 90%.

In another embodiment, an optical film includes a plurality of clusters. Each cluster includes a plurality of particles, a binder that coats and interconnects the plurality of the particles, and a plurality of voids that are dispersed between the plurality of clusters. The clusters in the plurality of clusters have an average size that is not less than about 500 nm. The voids in the plurality of voids have an average size that is not less than about 500 nm. In some cases, the clusters in the plurality of clusters are interconnected. In some cases, the voids in the plurality of voids are interconnected. In some cases, the clusters in the plurality of clusters have an average size that is not less than about 700 nm. In some cases, the voids in the plurality of voids have an average size that is not less than about 700 nm.

In another embodiment, an optical film includes a plurality of particles that are coated and interconnected by a binder. The interconnected plurality of particles define a plurality of interconnected voids that have an average size that is in a range from about 100 nm to about 300 nm. The optical film has a thickness that is not less than about 1 micron, an optical haze that is in a range from about 20% to about 70%, and an optical clarity that is not less than about 80%. In some cases, the optical clarity is not less than about 90%, or not less than about 95%.

In another embodiment, an optical film includes a plurality of elongated particles, and a plurality of voids. The optical film has an index of refraction that is not greater than about 1.3, a thickness that is not less than about 5 microns, and an optical haze that is not greater than about 2%. In some cases, the index of refraction is not greater than about 1.2. In some cases, the thickness is not less than about 10 microns, or not less than about 15 microns.

In another embodiment, an optical construction includes a structured surface that includes a plurality of structures. At least some of the structures have a height that is not less than about 10 microns. The optical construction also includes an optical film that is coated on and substantially planarizes the structured surface. The optical film has an index of refraction that is not greater than about 1.2, and an optical haze that is not greater than about 2%. In some cases, the optical film also includes a plurality of elongated particles and a plurality of voids.

BRIEF DESCRIPTION OF DRAWINGS

The invention may be more completely understood and appreciated in consideration of the following detailed description of various embodiments of the invention in connection with the accompanying drawings, in which.

In the specification, a same reference numeral used in multiple figures refers to the same or similar elements having the same or similar properties and functionalities.

DETAILED DESCRIPTION

Figure 1:
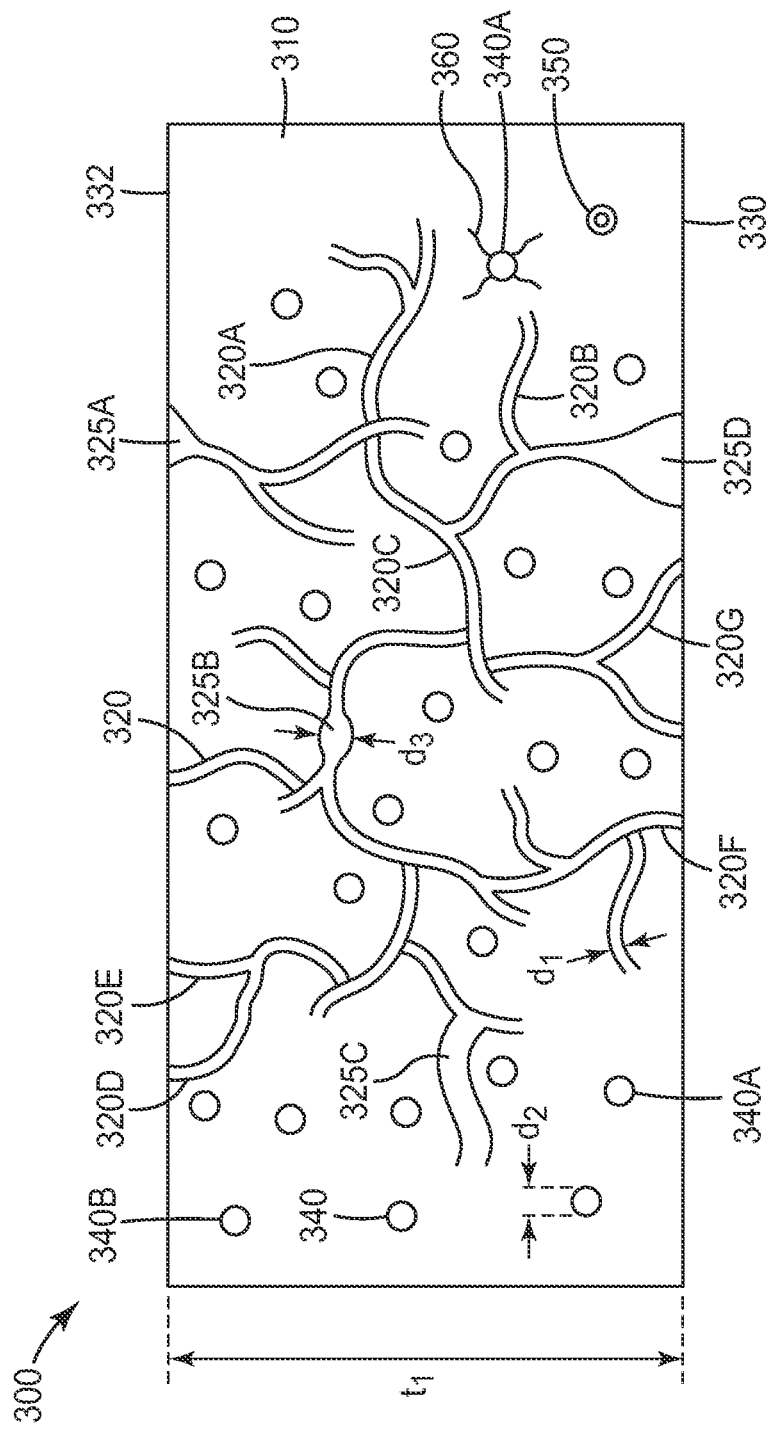
FIG. 1 is a schematic cross-sectional view of an optical film.

This invention generally relates to optical films that exhibit some low-index-like optical properties. Some disclosed optical films have a low optical haze and a low effective index of refraction, such as an optical haze of less than about 5% and an effective index of refraction that is less than about 1.35. Some disclosed optical films have a high optical haze and/or high diffuse optical reflectance while manifesting some low-index-like optical properties, such as, for example, the ability to support total internal reflection or enhance internal reflection. In some cases, the disclosed optical films can be incorporated in various optical or display systems such as, for example, a general lighting system, a liquid crystal display system, or a retro-reflecting optical system to improve system durability, reduce manufacturing cost, and reduce the overall thickness of the system while improving, maintaining or substantially maintaining at least some of the system optical properties such as, for example, the retro-reflectivity of the system or the on-axis brightness and contrast of an image displayed by the system.

The optical films disclosed herein, typically include a plurality of interconnected voids or a network of voids dispersed in a binder. At least some of the voids in the plurality or network are connected to one another via hollow tunnels or hollow tunnel-like passages. The voids are not necessarily free of all matter and/or particulates. For example, in some cases, a void may include one or more small fiber- or string-like objects that include, for example, a binder and/or nano-particles. Some disclosed optical films include multiple pluralities of interconnected voids or multiple networks of voids where the voids in each plurality or network are interconnected. In some cases, in addition to multiple pluralities of interconnected voids, the disclosed optical films include a plurality of closed or unconnected voids meaning that the voids are not connected to other voids via tunnels.

Some disclosed optical films support total internal reflection (TIR) or enhanced internal reflection (EIR) by virtue of including a plurality of voids. When light that travels in an optically clear non-porous medium is incident on a stratum possessing high porosity, the reflectivity of the incident light is much higher at oblique angles than at normal incidence. In the case of no or low haze voided films, the reflectivity at oblique angles greater than the critical angle is close to about 100%. In such cases, the incident light undergoes total internal reflection (TIR). In the case of high haze voided films, the oblique angle reflectivity can be close to 100% over a similar range of incident angles even though the light may not undergo TIR. This enhanced reflectivity for high haze films is similar to TIR and is designated as Enhanced Internal Reflectivity (EIR). As used herein, by a porous or voided optical film enhancing internal reflection (EIR), it is meant that the reflectance at the boundary of the voided and non-voided strata of the film or film laminate is greater with the voids than without the voids.

The voids in the disclosed optical films have an index of refraction $n_v$ and a permittivity $\varepsilon_v$, where $n_v^2=\varepsilon_v$, and the binder has an index of refraction $n_b$ and a permittivity $\varepsilon_b$, where $n_b^2=\varepsilon_b$. In general, the interaction of an optical film with light, such as light that is incident on, or propagates in, the optical film, depends on a number of film characteristics such as, for example, the film thickness, the binder index, the void or pore index, the pore shape and size, the spatial distribution of the pores, and the wavelength of light. In some cases, light that is incident on or propagates within the optical film, "sees" or "experiences" an effective permittivity $\varepsilon_{eff}$ and an effective index $n_{eff}$, where $n_{eff}$ can be expressed in terms of the void index $n_v$, the binder index $n_b$, and the void porosity or volume fraction "f". In such cases, the optical film is sufficiently thick and the voids are sufficiently small so that light cannot resolve the shape and features of a single or isolated void. In such cases, the size of at least a majority of the voids, such as at least 60% or 70% or 80% or 90% of the voids, is not greater than about $\lambda/5$, or not greater than about $\lambda/6$, or not greater than about $\lambda/8$, or not greater than about $\lambda/10$, or not greater than about $\lambda/20$, where $\lambda$ is the wavelength of light.

In some cases, light that is incident on a disclosed optical film is a visible light meaning that the wavelength of the light is in the visible range of the electromagnetic spectrum. In such cases, the visible light has a wavelength that is in a range from about 380 nm to about 750 nm, or from about 400 nm to about 700 nm, or from about 420 nm to about 680 nm. In such cases, the optical film has an effective index of refraction and includes a plurality of voids if the size of at least a majority of the voids, such as at least 60% or 70% or 80% or 90% of the voids, is not greater than about 70 nm, or not greater than about 60 nm, or not greater than about 50 nm, or not greater than about 40 nm, or not greater than about 30 nm, or not greater than about 20 nm, or not greater than about 10 nm.

In some cases, the disclosed optical films are sufficiently thick so that the optical film can reasonably have an effective index that can be expressed in terms of the indices of refraction of the voids and the binder, and the void or pore volume fraction or porosity. In such cases, the thickness of the optical film is not less than about 100 nm, or not less than about 200 nm, or not less than about 500 nm, or not less than about 700 nm, or not less than about 1,000 nm.

When the voids in a disclosed optical film are sufficiently small and the optical film is sufficiently thick, the optical film has an effective permittivity $\varepsilon_{eff}$ that can be expressed as:

$$\varepsilon_{eff}=f\varepsilon_v+(1-f)\varepsilon_b \quad (1)$$

In such cases, the effective index $n_{eff}$ of the optical film can be expressed as:

$$n_{eff}^2=f n_v^2+(1-f)n_b \quad (2)$$

In some cases, such as when the difference between the indices of refraction of the pores and the binder is sufficiently small, the effective index of the optical film can be approximated by the following expression:

$$n_{eff}=f n_v+(1-f)n_b \quad (3)$$

In such cases, the effective index of the optical film is the volume weighted average of the indices of refraction of the voids and the binder. For example, an optical film that has a void volume fraction of about 50% and a binder that has an index of refraction of about 1.5, has an effective index of about 1.25.

FIG. 1 is a schematic cross-sectional view of an optical film 300 that includes a network of voids or plurality of interconnected voids 320 and a plurality of particles 340 dispersed substantially uniformly within a binder 310. Optical film 300 has a porous interior by virtue of the presence of network of voids 320 within the optical film. In general, the optical film can include one or more networks of interconnected pores or voids. For example, network of voids 320 can be regarded to include interconnected voids or pores 320A-320C. In some cases, the optical film is a porous film meaning that the network of voids 320 forms one or more passages between first and second major surfaces 330 and 332, respectively.

The network of voids can be regarded to include a plurality of interconnected voids. Some of the voids can be at a surface of the optical film and can be regarded to be surface voids. For example, in the exemplary optical film 300, voids 320D and 320E are at a second major surface 332 of the optical film and can be regarded as surface voids 320D and 320E, and voids 320F and 320G are at a first major surface 330 of the optical film and can be regarded as surface voids 320F and 320G. Some of the voids, such as for example voids 320B and 320C, are within the interior of the optical film and away from the exterior surfaces of the optical film and can be regarded as interior voids 320B and 320C, even though an interior void can be connected to a major surface via, for example, other voids.

Voids 320 have a size $d_1$ that can generally be controlled by choosing suitable composition and fabrication, such as coating, drying and curing conditions. In general, $d_1$ can be any desired value in any desired range of values. For example, in some cases, at least a majority of the voids, such as at least 60% or 70% or 80% or 90% or 95% of the voids, have a size that is in a desired range. For example, in some cases, at least a majority of the voids, such as at least 60% or 70% or 80% or 90% or 95% of the voids, have a size that is not greater than about 10 microns, or not greater than about 7 microns, or not greater than about 5 microns, or not greater than about 4 microns, or not greater than about 3 microns, or not greater than about 2 microns, or not greater than about 1 micron, or not greater than about 0.7 microns, or not greater than about 0.5 microns.

In some cases, plurality of interconnected voids 320 has an average void or pore size that is not greater than about 5 microns, or not greater than about 4 microns, or not greater than about 3 microns, or not greater than about 2 microns, or not greater than about 1 micron, or not greater than about 0.7 microns, or not greater than about 0.5 microns.

In some cases, some of the voids can be sufficiently small so that their primary optical effect is to reduce the effective index, while some other voids can reduce the effective index and scatter light, while still some other voids can be sufficiently large so that their primary optical effect is to scatter light.

Particles 340 have a size $d_2$ that can be any desired value in any desired range of values. For example, in some cases at least a majority of the particles, such as at least 60% or 70% or 80% or 90% or 95% of the particles, have a size that is in a desired range. For example, in some cases, at least a majority of the particles, such as at least 60% or 70% or 80% or 90% or 95% of the particles, have a size that is not greater than about 5 microns, or not greater than about 3 microns, or not greater than about 2 microns, or not greater than about 1 micron, or not greater than about 700 nm, or not greater than about 500 nm, or not greater than about 200 nm, or not greater than about 100 nm, or not greater than about 50 nm.

In some cases, plurality of particles 340 has an average particle size that is not greater than about 5 microns, or not greater than about 3 microns, or not greater than about 2 microns, or not greater than about 1 micron, or not greater than about 700 nm, or not greater than about 500 nm, or not greater than about 200 nm, or not greater than about 100 nm, or not greater than about 50 nm.

In some cases, some of the particles can be sufficiently small so that they primary affect the effective index, while some other particles can affect the effective index and scatter light, while still some other particles can be sufficiently large so that their primary optical effect is to scatter light.

In some cases, $d_1$ and/or $d_2$ are sufficiently small so that the primary optical effect of the voids and the particles is to affect the effective index of optical film 300. For example, in such cases, $d_1$ and/or $d_2$ are not greater than about $\lambda/5$, or not greater than about $\lambda/6$, or not greater than about $\lambda/8$, or not greater than about $\lambda/10$, or not greater than about $\lambda/20$, where $\lambda$ is the wavelength of light. As another example, in such cases, $d_1$ and $d_2$ are not greater than about 70 nm, or not greater than about 60 nm, or not greater than about 50 nm, or not greater than about 40 nm, or not greater than about 30 nm, or not greater than about 20 nm, or not greater than about 10 nm. In such cases, the voids and the particles may also scatter light, but the primary optical effect of the voids and the particles is to define an effective medium in the optical film that has an effective index. The effective index depends, in part, on the indices of refraction of the voids, the binder, and the particles. In some cases, the effective index is a reduced effective index, meaning that the effective index is less than the index of the binder and the index of the particles.

In cases where the primary optical effect of the voids and/or the particles is to affect the index, $d_1$ and $d_2$ are sufficiently small so that a substantial fraction, such as at least about 60%, or at least about 70%, or at least about 80%, or at least about 90%, or at least about 95% of voids 320 and particles 340 have the primary optical effect of reducing the effective index. In such cases, a substantial fraction, such as at least about 60%, or at least about 70%, or at least about 80%, or at least about 90%, or at least about 95% the voids and/or the particles, have a size that is in a range from about 1 nm to about 200 nm, or from about 1 nm to about 150 nm, or from about 1 nm to about 100 nm, or from about 1 nm to about 50 nm, or from about 1 nm to about 20 nm.

In some cases, the index of refraction $n_1$ of particles 340 can be sufficiently close to the index $n_b$ of binder 310, so that the effective index does not depend, or depends very little, on the index of refraction of the particles. In such cases, the difference between $n_1$ and $n_b$ is not greater than about 0.01, or not greater than about 0.007, or not greater than about 0.005, or not greater than about 0.003, or not greater than about 0.002, or not greater than about 0.001. In some cases, particles 340 are sufficiently small and their index is sufficiently close to the index of the binder, that the particles do not primarily scatter light or affect the index. In such cases, the primary effect of the particles can, for example, be to enhance the strength of optical film 300. In some cases, particles 340 can enhance the process of making the optical film although, in general, optical film 300 can be made with no particles.

In cases where the primary optical effect of network of voids 320 and particles 340 is to affect the effective index and not to, for example, scatter light, the optical haze of optical film 300 that is due to voids 320 and particles 340 is not greater than about 5%, or not greater than about 4%, or not greater than about 3.5%, or not greater than about 4%, or not greater than about 3%, or not greater than about 2.5%, or not greater than about 2%, or not greater than about 1.5%, or not greater than about 1%. In such cases, the effective index of the effective medium of the optical film is not greater than about 1.35, or not greater than about 1.3, or not greater than about 1.25, or not greater than about 1.2, or not greater than about 1.15, or not greater than about 1.1, or not greater than about 1.05.

In cases where optical film 300 can reasonably have a reduced effective index, the thickness of the optical film is not less than about 100 nm, or not less than about 200 nm, or not less than about 500 nm, or not less than about 700 nm, or not less than about 1,000 nm, or not less than about 1500 nm, or not less than about 2000 nm.

In some cases, $d_1$ and/or $d_2$ are sufficiently large so that their primary optical effect is to scatter light and produce optical haze. In such cases, $d_1$ and/or $d_2$ are not less than about 200 nm, or not less than about 300 nm, or not less than about 400 nm, or not less than about 500 nm, or not less than about 600 nm, or not less than about 700 nm, or not less than about 800 nm, or not less than about 900 nm, or not less than about 1000 nm. In such cases, the voids and the particles may also affect the index, but their primarily optical effect is to scatter light. In such cases, light incident on the optical film can be scattered by both the voids and the particles.

Optical film 300 can be used in many optical applications. For example, in some cases, the optical film can be used to support or promote total internal reflection (TIR) or enhance internal reflection meaning that the reflection is greater than what a material with index $n_b$ would produce. In such cases, optical film 300 is sufficiently thick so that the evanescent tail of a light ray that undergoes total internal reflection at a surface of the optical film, does not optically couple, or optically couples very little, across the thickness of the optical film. In such cases, the thickness $t_1$ of optical film 300 is not less than about 1 micron, or not less than about 1.1 micron, or not less than about 1.2 microns, or not less than about 1.3 microns, or not less than about 1.4 microns, or not less than about 1.5 microns, or not less than about 1.7 microns, or not less than about 2 microns. A sufficiently thick optical film 300 can prevent or reduce an undesired optical coupling of the evanescent tail of an optical mode across the thickness of the optical film.

In some cases, optical film 300 has a low optical haze. In such cases, the optical haze of the optical film is not greater than about 5%, or not greater than about 4%, or not greater than about 3.5%, or not greater than about 4%, or not greater than about 3%, or not greater than about 2.5%, or not greater than about 2%, or not greater than about 1.5%, or not greater than about 1%. In such cases, the optical film can have a reduced effective index that is not greater than about 1.35, or not greater than about 1.3, or not greater than about 1.2, or not greater than about 1.15, or not greater than about 1.1, or not greater than about 1.05. For light normally incident on optical film 300, optical haze, as used herein, is defined as the ratio of the transmitted light that deviates from the normal direction by more than 4 degrees to the total transmitted light. Haze values disclosed herein were measured using a Haze-Gard Plus haze meter (BYK-Gardiner, Silver Springs, Md.) according to the procedure described in ASTM D1003.

In some cases, optical film 300 has a high optical haze. In such cases, the haze of the optical film is not less than about 40%, or not less than about 50%, or not less than about 60%, or not less than about 70%, or not less than about 80%, or not less than about 90%, or not less than about 95%.

In some cases, optical film 300 has a high diffuse optical reflectance. In such cases, the diffuse optical reflectance of the optical film is not less than about 30%, or not less than about 40%, or not less than about 50%, or not less than about 60%. In some cases, optical film 300 has a high optical clarity. For light normally incident on optical film 300, optical clarity, as used herein, refers to the ratio $(T_1-T_2)/(T_1+T_2)$, where $T_1$ is the transmitted light that deviates from the normal direction between 1.6 and 2 degrees, and $T_2$ is the transmitted light that lies between zero and 0.7 degrees from the normal direction. Clarity values disclosed herein were measured using a Haze-Gard Plus haze meter from BYK-Gardiner. In the cases where optical film 300 has a high optical clarity, the clarity is not less than about 40%, or not less than about 50%, or not less than about 60%, or not less than about 70%, or not less than about 80%, or not less than about 90%, or not less than about 95%.

In some cases, optical film 300 has a low optical clarity. In such cases, the optical clarity of the optical film is not greater than about 10%, or not greater than about 7%, or not greater than about 5%, or not greater than about 4%, or not greater than about 3%, or not greater than about 2%, or not greater than about 1%.

In general, optical film can have any porosity or void volume fraction that may be desirable in an application. In some cases, the volume fraction of plurality of voids 320 in optical film 300 is not less than about 20%, or not less than about 30%, or not less than about 40%, or not less than about 50%, or not less than about 60%, or not less than about 70%, or not less than about 80%, or not less than about 90%.

In some cases, optical film can manifest some low-index properties, even if the optical film has a high optical haze and/or diffuse reflectance. For example, in such cases, the optical film can support TIR at angles that correspond to an index that is smaller than the index $n_b$ of binder 310.

In the exemplary optical film 300, particles 340, such as particles 340A and 340B, are solid particles. In some cases, optical film 300 may additionally or alternatively include a plurality of hollow or porous particles 350.

Particles 340 can be any type particles that may be desirable in an application. For example, particles 340 can be organic or inorganic particles. For example, particles 340 can be silica, zirconium oxide or alumina particles.

Particles 340 can have any shape that may be desirable or available in an application. For example, particles 340 can have a regular or irregular shape. For example, particles 340 can be approximately spherical. As another example, the particles can be elongated. In such cases, optical film 300 includes a plurality of elongated particles 320. In some cases, the elongated particles have an average aspect ratio that is not less than about 1.5, or not less than about 2, or not less than about 2.5, or not less than about 3, or not less than about 3.5, or not less than about 4, or not less than about 4.5, or not less than about 5. In some cases, the particles can be in the form or shape of a string-of-pearls (such as Snowtex-PS particles available from Nissan Chemical, Houston, Tex.) or aggregated chains of spherical or amorphous particles, such as fumed silica.

Particles 340 may or may not be functionalized. In some cases, particles 340 are not functionalized. In some cases, particles 340 are functionalized so that they can be dispersed in a desired solvent or binder 310 with no, or very little, clumping. In some cases, particles 340 can be further functionalized to chemically bond to binder 310. For example, particles 340, such as particle 340A, can be surface modified and have reactive functionalities or groups 360 to chemically bond to binder 310. In such cases, at least a significant fraction of particles 340 is chemically bound to the binder. In some cases, particles 340 do not have reactive functionalities to chemically bond to binder 310. In such cases, particles 340 can be physically bound to binder 310.

In some cases, some of the particles have reactive groups and others do not have reactive groups. For example in some cases, about 10% of the particles have reactive groups and about 90% of the particles do not have reactive groups, or about 15% of the particles have reactive groups and about 85% of the particles do not have reactive groups, or about 20% of the particles have reactive groups and about 80% of the particles do not have reactive groups, or about 25% of the particles have reactive groups and about 75% of the particles do not have reactive groups, or about 30% of the particles have reactive groups and about 60% of the particles do not have reactive groups, or about 35% of the particles have reactive groups and about 65% of the particles do not have reactive groups, or about 40% of the particles have reactive groups and about 60% of the particles do not have reactive groups, or about 45% of the particles have reactive groups and about 55% of the particles do not have reactive groups, or about 50% of the particles have reactive groups and about 50% of the particles do not have reactive groups.

The ensemble of particles may include a mixture of sizes, reactive and non-reactive particles and different types of particles (e.g., silica and zirconium oxide).

Binder 310 can be or include any material that may be desirable in an application. For example, binder 310 can be a UV curable material that forms a polymer, such as a cross-linked polymer. In general, binder 310 can be any polymerizable material, such as a polymerizable material that is radiation-curable.

Optical film 300 can be produced using any method that may be desirable in an application. In some cases, optical film 300 can be produced by the processes described in U.S. Provisional Application No. 61/169,429, titled "PROCESS AND APPARATUS FOR A NANOVOIDED ARTICLE", and U.S. Provisional Application No. 61/169,427, titled "PROCESS AND APPARATUS FOR COATING WITH REDUCED DEFECTS", the disclosures of which are incorporated in their entirety herein by reference. In one process, first a solution is prepared that includes a plurality of particles, such as nano-particles, and a polymerizable material dissolved in a solvent, where the polymerizable material can include, for example, one or more types of monomers. Next, the polymerizable material is polymerized, for example by applying heat or light, to form an insoluble polymer matrix in the solvent. In some cases, after the polymerization step, the solvent may still include some of the polymerizable material, although at a lower concentration. Next, the solvent is removed by drying or evaporating the solution resulting in optical film 300 that includes a network, or a plurality, of voids 320 dispersed in polymer binder 310. The optical film further includes plurality of particles 340 dispersed in the polymer. The particles are bound to the binder, where the bonding can be physical or chemical.

Optical film 300 can have other materials in addition to binder 310 and particles 340. For example, optical film 300 can include one or more additives, such as for example, coupling agents, to help wet the surface of a substrate, not expressly shown in FIG. 1, on which the optical film is formed. As another example, optical film 300 can include one or more colorants, such a carbon black, for imparting a color, such as the black color, to the optical film. Other exemplary materials in optical film 300 include initiators, such as one or more photo-initiators, anti-stats, UV absorbers and release agents. In some cases, optical film 300 can include a down converting material that is capable of absorbing light and reemitting a longer wavelength light. Exemplary down converting materials include phosphors.

In general, optical film 300 can have a desirable porosity for any weight ratio of binder 310 to plurality of particles 340. Accordingly, in general, the weight ratio can be any value that may be desirable in an application. In some cases, the weight ratio of binder 310 to plurality of particles 340 is not less than about 1:2.5, or not less than about 1:2.3, or not less than about 1:2, or not less than about 1:1, or not less than about 1.5:1, or not less than about 2:1, or not less than about 2.5:1, or not less than about 3:1, or not less than about 3.5:1, or not less than about 4:1, or not less than about 5:1. In some cases, the weight ratio is in a range from about 1:2.3 to about 4:1.

In some cases, top major surface 332 of optical film 300 can be treated to, for example, improve the adhesion of the optical film to another layer. For example, the top surface can be corona treated.

Figure 2:
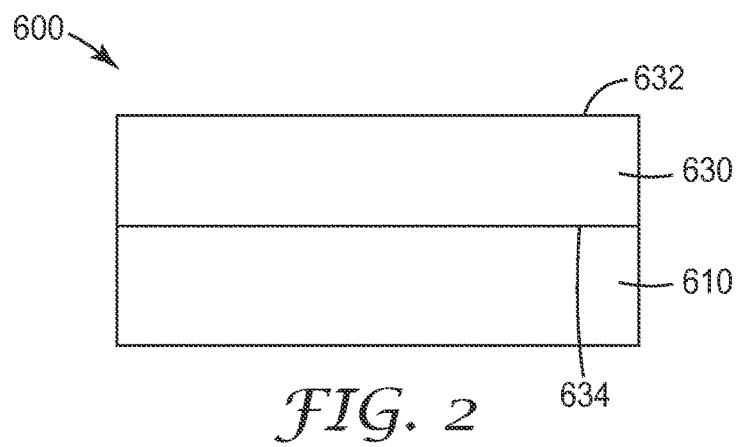
FIG. 2 is schematic side-view of an optical construction.

FIG. 2 is a schematic side-view of an optical construction 600 that includes an optical film 630 disposed on a substrate 610. In some cases, substrate 610 is a release liner that provides a transferable optical film 630, meaning that, for example, the exposed top major surface 632 of the optical film may be placed in contact with a substrate or surface and the release liner may thereafter be stripped away from the optical film to expose a bottom major surface 634 of the optical film that can, for example, be bonded to another substrate or surface. The release force for releasing low index layer 630 from a release liner 610 is generally less than about 200 g-force/inch, or less than about 150 g-force/inch, or less than about 100 g-force/inch, or less than about 75 g-force/inch, or less than about 50 g-force/inch.

Substrate 610 can be or include any material that may be suitable in an application, such as a dielectric, a semiconductor, or a metal. For example, substrate 610 can include or be made of glass and polymers such as polyethylene terapthalate (PET), polycarbonates, and acrylics. In some case, the substrate can have multiple layers.

Optical film 630 can be similar to any optical film disclosed herein. For example, optical film 630 can be similar to optical film 300. As another example, optical film 630 can include multiple layers, where each layer is similar to optical film 300. In some cases, optical film 630 may be coated directly onto release liner 610. In some cases, optical film 630 may be first formed and thereafter transferred onto release liner 610. Release liner 610 can be translucent, transparent, or opaque.

Figure 3:
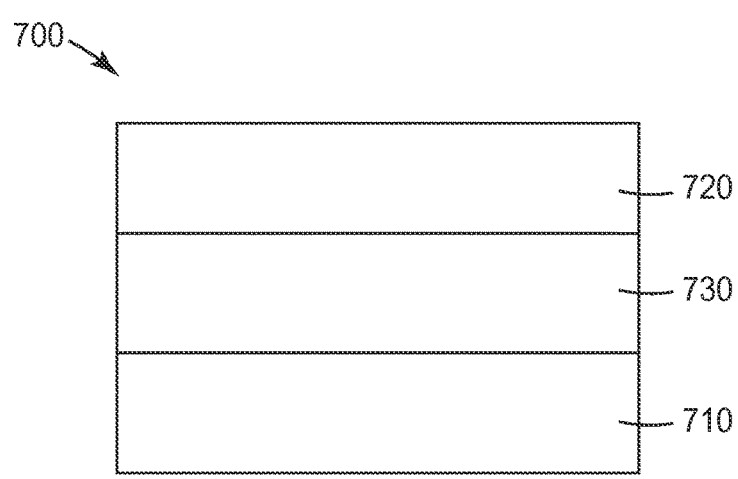
FIG. 3 is schematic side-view of another optical construction.

FIG. 3 is a schematic side-view of an optical construction 700 that includes an optical film 730 disposed on a substrate 710, and an optical adhesive layer 720 disposed on optical film 730. In some cases, substrate 710 can be a release liner. In some cases the optical adhesive layer 720 can act as a sealer to inhibit infiltration of voids of optical film 730. Substrate 710 can be or include any material that may be suitable in an application, such as a dielectric, a semiconductor, or a metal. In some cases, it may be desirable to have adhesive layer 720 and optical film 730 on opposite sides of the substrate 710. In other cases, it may be desirable to have optical film 730 on both sides of substrate 710.

Optical adhesive layer 720 can be any optical adhesive that may be desirable and/or available in an application. Optical adhesive layer 720 is of sufficient optical quality and light stability such that, for example, the adhesive layer does not yellow with time or upon exposure to weather so as to degrade the optical performance of the adhesive and the optical film. In some cases, optical adhesive layer 720 can be a substantially clear optical adhesive meaning that the adhesive layer has a high specular transmittance and a low diffuse transmittance. For example, in such cases, the specular transmittance of optical adhesive layer 720 is not less than about 70%, or not less than about 80%, or not less than about 90%, or not less than about 95%. In some cases, optical adhesive layer 720 can be a substantially diffuse optical adhesive, meaning that the adhesive layer has a high diffuse transmittance and a low specular transmittance. For example, in such cases, the diffuse transmittance of optical adhesive layer 720 is not less than about 60%, or not less than about 70%, or not less than about 80%.

Exemplary optical adhesives include pressure sensitive adhesives (PSAs), heat-sensitive adhesives, solvent-volatile adhesives, repositionable adhesives or reworkable adhesives, and UV-curable adhesives such as UV-curable optical adhesives available from Norland Products, Inc.

Exemplary PSAs include those based on natural rubbers, synthetic rubbers, styrene block copolymers, (meth)acrylic block copolymers, polyvinyl ethers, polyolefins, and poly (meth)acrylates. As used herein, (meth)acrylic (or acrylate) refers to both acrylic and methacrylic species. Other exemplary PSAs include (meth)acrylates, rubbers, thermoplastic elastomers, silicones, urethanes, and combinations thereof. In some cases, the PSA is based on a (meth)acrylic PSA or at least one poly(meth)acrylate. Exemplary silicone PSAs include a polymer or gum and an optional tackifying resin. Other exemplary silicone PSAs include a polydiorganosiloxane polyoxamide and an optional tackifier.

Optical film 730 can be similar to any optical film disclosed herein. For example, optical film 730 can be similar to optical film 300. As another example, optical film 730 can include multiple layers, where each layer is similar to optical film 300.

Figure 4:
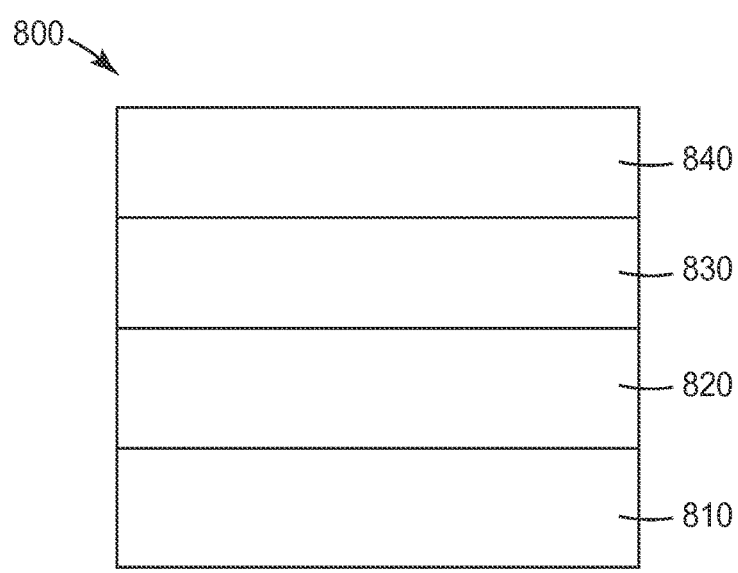
FIG. 4 is schematic side-view of another optical construction.

FIG. 4 is a schematic side-view of an optical construction 800 that includes a first optical adhesive layer 820 disposed on a substrate 810, an optical film 830 disposed on first optical adhesive layer 820, and an optional second optical adhesive layer 840 disposed on low index layer 830. In some cases, substrate 810 can be a release liner. Optical adhesive layers 820 and 840 can be similar to optical adhesive layer 720. In some cases, optical adhesive layers 820 and 840 have the same index of refraction. In some cases, the two adhesive layers can have different indices of refraction.

Optical film 830 can be similar to any optical film disclosed herein. For example, optical film 830 can be similar to optical film 300. As another example, optical film 830 can include multiple layers, where each layer is similar to optical film 300.

Some of the advantages of the disclosed films, layers, constructions, and systems are further illustrated by the following examples. The particular materials, amounts and dimensions recited in this example, as well as other conditions and details, should not be construed to unduly limit the present invention.

In the examples, the index of refraction was measured using a Metricon Model 2010 Prism Coupler (available from Metricon Corp., Pennington, N.J.). Optical transmittance and haze were measured using a Haze-Gard Plus haze meter (available from BYK-Gardiner, Silver Springs, Md.).

EXAMPLE A

A coating solution "A" was made. First, a "906" composition (available from 3M Company, St. Paul, Minn.) was obtained. The 906 composition included: 18.4 wt % 20 nm silica particles (Nalco 2327) surface modified with methacryloyloxypropyltrimethoxysilane (acrylate silane), 25.5 wt % Pentaerthritol tri/tetra acrylate (PETA), 4.0 wt % N,N-dimethylacrylamide (DMA), 1.2 wt % Irgacure 184, 1.0 wt % Tinuvin 292, 46.9 wt % solvent isopropanol, and 3.0 wt % water. The 906 composition was approximately 50% solid by weight. Next, the 906 composition was diluted to 35 wt % solid with solvent 1-methoxy 2-propanol resulting in coating solution A.

EXAMPLE B

A coating solution "B" was made. First, 360 g of Nalco 2327 colloidal silica particles (40% wt solid and an average particle diameter of about 20 nanometers) (available from Nalco Chemical Company, Naperville Ill.) and 300 g of solvent 1-methoxy-2-propanol were mixed together under rapid stirring in a 2-liter three-neck flask that was equipped with a condenser and a thermometer. Next, 22.15 g of Silquest A-174 silane (available from GE Advanced Materials, Wilton Conn.) was added. The mixture was stirred for 10 min. Next, an additional 400 g of 1-methoxy-2-propanol was added. The mixture was heated at 85° C. for 6 hours using a heating mantle. The resulting solution was allowed to cool down to room temperature. Next, most of water and 1-methoxy-2-propanol solvents (about 700 g) were removed using a rotary evaporator under a 60° C. water-bath. The resulting solution was 44% wt A-174 modified 20 nm silica clear dispersed in 1-methoxy-2-propanol. Next, 70.1 g of this solution, 20.5 g of SR 444 (available from Sartomer Company, Exton Pa.), 1.375 g of photoinitiator Irgacure 184 (available from Ciba Specialty Chemicals Company, High Point N.C.), and 80.4 g of isopropyl alcohol were mixed together by stirring to form a homogenous coating solution B.

EXAMPLE C

A coating solution "C" was made. First, 309 g of Nalco 2327 (40% wt solid) and 300 g of 1-methoxy-2-propanol were mixed together under rapid stirring in a 2-liter three-neck flask that was equipped with a condenser and a thermometer. Next, 9.5 g of Silquest A-174 and 19.0 g of Siquest A-1230 were added, and the resulting mixture was stirred for 10 min. The mixture was heated at 80° C. for 1 hour using a heating mantle. Next, an additional 400 g of 1-methoxy-2-propanol was added. The mixture was kept at 80° C. for 16 hours. The resulting solution was allowed to cool down to room temperature. Next, most of water and 1-methoxy-2-propanol solvents (about 700 grams) were removed using a rotary evaporator under a 60° C. water-bath. The resulting solution was 48.7 wt % A174/A1230 modified 20 nm silica clear dispersed in 1-methoxy-2-propanol. Next, 63.4 g of this solution, 20.5 g of SR 444, 1.32 g of the photoinitiator Irgacure 184, and 87.1 g of isopropyl alcohol were mixed together by stirring to form a homogenous coating solution C.

EXAMPLE D

A coating solution "D" was made. 300 g of Nalco 2329 silica particles (40% wt solid) (with an average particle size of 75 nm, available from Nalco Chemical Company, Naperville Ill.) and 300 g of 1-methoxy-2-propanol were mixed together under rapid stirring in a 1-liter flask that was equipped with a condenser and a thermometer. Next, 7.96 g of Silquest A-174 was added. The resulting mixture was stirred for 10 min. Next, an additional 400 g of 1-methoxy-2-propanol was added. The resulting mixture was heated at 85° C. for 6 hours using a heating mantle. The resulting solution was allowed to cool down to room temperature. Next, most of water and 1-methoxy-2-propanol solvents (about 630 g) were removed using a rotary evaporator under a 60° C. water-bath. The resulting solution was 34.6 wt % A-174 modified 75 nm silica dispersed in 1-methoxy-2-propanol. Next, 135.5 g of this solution, 31.2 g of SR444, 1.96 g of the photoinitiator Irgacure 184, and 93.3 g of isopropyl alcohol were mixed together by stirring to form a homogenous coating solution D.

EXAMPLE E

A coating procedure "E" was developed. First, a coating solution was syringe-pumped at a rate of 3 cc/min into a 10.2 cm (4-inch) wide slot-type coating die. The slot coating die uniformly distributed a 10.2 cm wide coating onto a substrate moving at 152 cm/min (5 ft/min).

Next, the coating was polymerized by passing the coated substrate through a UV-LED cure chamber that included a quartz window to allow passage of UV radiation. The UV-LED bank included a rectangular array of 160 UV-LEDs, 8 down-web by 20 cross-web (approximately covering a 10.2 cm×20.4 cm area). The LEDs (available from Cree, Inc., Durham N.C.) operated at a nominal wavelength of 385 nm, and were run at 45 Volts at 8 Amps, resulting in a UV-A dose of 0.212 joules per square cm. The UV-LED array was powered and fan-cooled by a TENMA 72-6910 (42V/10A) power supply (available from Tenma, Springboro Ohio). The UV-LEDs were positioned above the quartz window of the cure chamber at a distance of approximately 2.5 cm from the substrate. The UV-LED cure chamber was supplied with a flow of nitrogen at a flow rate of 46.7 liters/min (100 cubic feet per hour) resulting in an oxygen concentration of approximately 150 ppm in the cure chamber.

After being polymerized by the UV-LEDs, the solvent in the cured coating was removed by transporting the coated substrate to a drying oven at 150° F. for 2 minutes at a web speed of 5 ft/min. Next, the dried coating was post-cured using a Fusion System Model I300P configured with an H-bulb (available from Fusion UV Systems, Gaithersburg Md.). The UV Fusion chamber was supplied with a flow of nitrogen that resulted in an oxygen concentration of approximately 50 ppm in the chamber.

EXAMPLE F

A coating procedure "F" was developed. First, a coating solution was syringe-pumped at a rate of 2.7 cc/min into a 10.2 cm (4-inch) wide slot-type coating die. The slot coating die uniformly distributed a 10.2 cm wide coating onto a substrate moving at 5 ft/min (152 cm/min).

Next, the coating was polymerized by passing the coated substrate through a UV-LED cure chamber that included a quartz window to allow passage of UV radiation. The UV-LED bank included a rectangular array of 352 UV-LEDs, 16 down-web by 22 cross-web (approximately covering a 20.3 cm×20.3 cm area). The UV-LEDs were placed on two water-cooled heat sinks The LEDs (available from Cree, Inc., Durham N.C.) operated at a nominal wavelength of 395 nm, and were run at 45 Volts at 10 Amps, resulting in a UV-A dose of 0.108 joules per square cm. The UV-LED array was powered and fan-cooled by a TENMA 72-6910 (42V/10A) power supply (available from Tenma, Springboro Ohio). The UV-LEDs were positioned above the cure chamber quartz window at a distance of approximately 2.54 cm from the substrate. The UV-LED cure chamber was supplied with a flow of nitrogen at a flow rate of 46.7 liters/min (100 cubic feet per hour) resulting in an oxygen concentration of approximately 150 ppm in the cure chamber.

After being polymerized by the UV-LEDs, the solvent in the cured coating was removed by transporting the coating to a drying oven operating at 150° F. for 2 minutes at a web speed of 5 ft/min. Next, the dried coating was post-cured using a Fusion System Model I300P configured with an H-bulb (available from Fusion UV Systems, Gaithersburg Md.). The UV Fusion chamber was supplied with a flow of nitrogen that resulted in an oxygen concentration of approximately 50 ppm in the chamber.

EXAMPLE 1

An optical construction similar to optical construction 600 was fabricated. Coating solution B from Example B was coated on a 0.051 mm thick PET substrate 610 using the coating method described in Example E, except that the UV-LEDs were run at 6 Amps, resulting in a UV-A dose of 0.174 joules per square cm. The resulting optical film 630 had an index of refraction of about 1.20 and a thickness of about 5 microns.

EXAMPLE 2

An optical construction similar to Example 1 was made, except that the coating method described in Example E was modified. In particular, the LEDs were run at 7 Amps, resulting in a UV-A dose of 0.195 joules per square cm. Optical film 630 had an index of refraction of about 1.19 and a thickness of about 7 microns.

EXAMPLE 3

An optical construction similar to optical construction 600 was fabricated. First, a coating solution was made. In a 2 liter three-neck flask, equipped with a condenser and a thermometer, 960 grams of IPA-ST-UP organosilica elongated particles (available from Nissan Chemical Inc., Houston, Tex.), 19.2 grams of deionized water, and 350 grams of 1-methoxy-2-propanol were mixed under rapid stirring. The elongated particles had a diameter in a range from about 9 nm to about 15 nm and a length in a range of about 40 nm to about 100 nm. The particles were dispersed in a 15.2% wt IPA. Next, 22.8 grams of Silquest A-174 silane (available from GE Advanced Materials, Wilton, Conn.) was added to the flask. The resulting mixture was stirred for 30 minutes.

The mixture was kept at 81° C. for 16 hours. Next, the solution was allowed to cool down to room temperature. Next, about 950 grams of the solvent in the solution were removed using a rotary evaporator under a 40° C. waterbath, resulting in a 41.7% wt A-174-modified elongated silica clear dispersion in 1-methoxy-2-propanol.

Next, 407 grams of this clear dispersion, 165.7 grams of SR 444 (available from Sartomer Company, Exton, Pa.), 8.28 grams of photoinitiator Irgacure 184 and 0.828 grams of photoinitiator Irgacure 819 (both available from Ciba Specialty Chemicals Company, High Point N.C.), and 258.6 grams of isopropyl alcohol were mixed together and stirred resulting in a homogenous coating solution of 40% solids. Next, 300 grams of this solution was mixed with 100 grams of isopropyl alcohol resulting in a coating solution of 30% solids.

Next, the 30% solids solution was coated on a 2 mil (0.051 mm) thick PET substrate 610 using the coating method described in Example F except that the syringe-pump rate was 2.5 cc/min and the current to the LEDs was 13 Amps, resulting in a UV-A dose of 0.1352 joules per square cm. The resulting optical film 630 had a total optical transmittance of about 94.9%, an optical haze of 0.86%, a refractive index of 1.17, and a thickness of about 4.5 microns.

Figure 5:
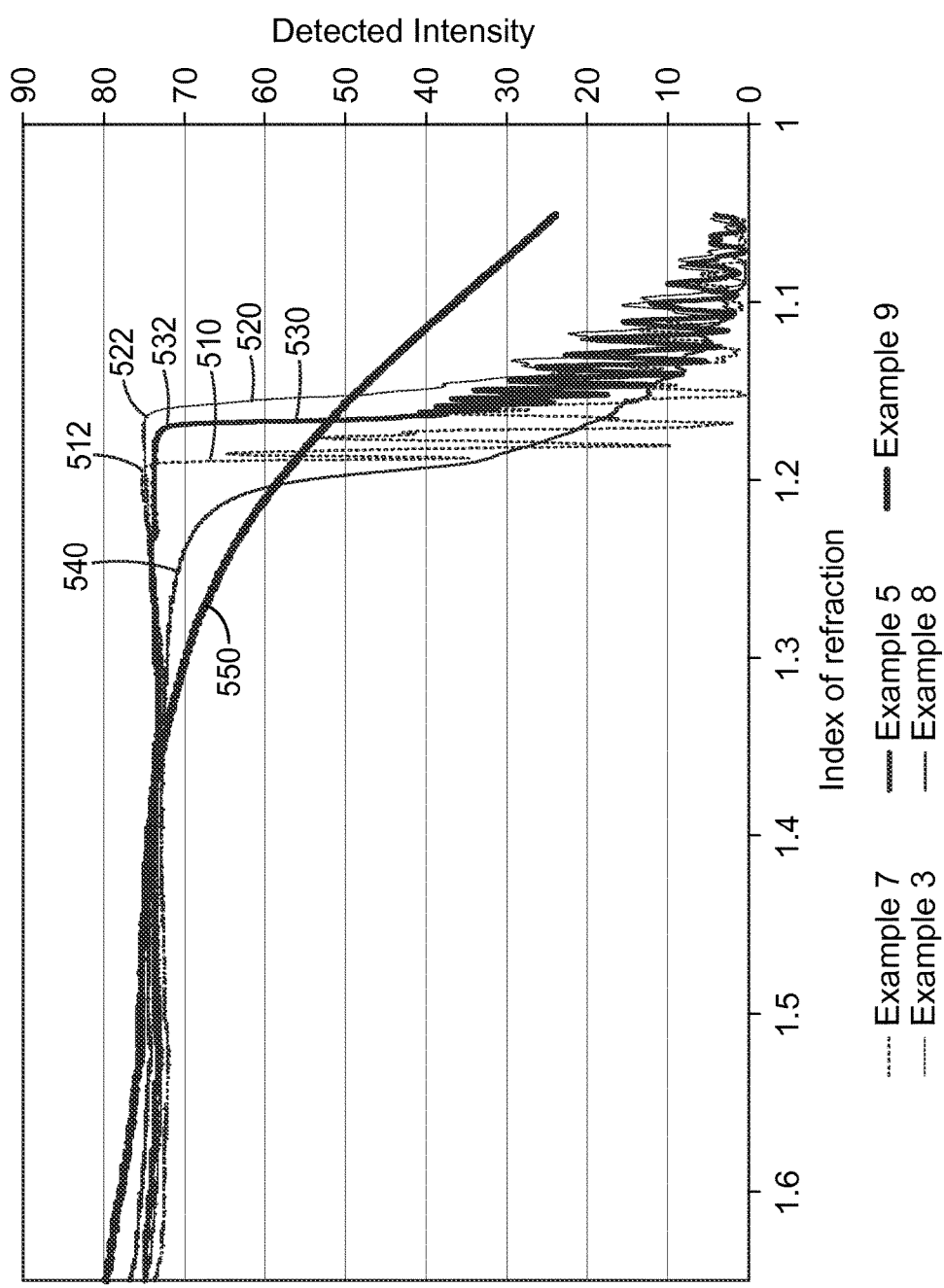
FIG. 5 is a plot of light intensity as a function of index of refraction in a prism coupler.

The index of refraction of this optical film was measured using a Metricon Model 2010 prism coupler. Curve 520 in FIG. 5 shows the plot that was generated by the Metricon prism coupler. The vertical axis represents the light intensity detected by the prism coupler. The rather sharp knee 522 in curve 520 corresponds to an index of 1.17 which was the index measured for the optical film.

EXAMPLE 4

An optical construction similar to Example 3 was fabricated except that the syringe flow rate was 4.5 cc/min. The resulting optical film 630 had a total optical transmittance of about 94.7%, an optical haze of 1.32%, a refractive index of 1.16, and a thickness of about 6 microns.

EXAMPLE 5

An optical construction similar to optical construction 600 was fabricated. First, a coating solution was made. In a 1 liter three-neck flask, equipped with a condenser and a thermometer, 400 grams of IPA-ST-MS organosilica particles (available from Nissan Chemical Inc., Houston, Tex.) and 8 grams of deionized were mixed under rapid stirring. The particles were approximately spherical and had a diameter in a range from about 17 nm to about 23 nm. The IPA-ST-MS particles were dispersed in a 30% wt IPA. Next, 18.5 grams of Silquest A-174 silane (available from GE Advanced Materials, Wilton, Conn.) was added to the flask. The resulting mixture was stirred for 10 minutes.

Next, 91.8 grams of this mixture, 20.5 grams of SR 444, 1.3 grams of photoinitiator Irgacure 184, 39.2 grams of 1-methoxy-2-propanol, and 19.4 grams of isopropyl alcohol were mixed together and stirred resulting in a homogenous coating solution.

Next, this solution was coated on a 2 mil (0.051 mm) thick PET substrate 610 using the coating method described in Example F except that the syringe-pump rate was 7 cc/min and the current to the LEDs was 13 Amps, resulting in a UV-A dose of 0.1352 joules per square cm. The resulting optical film 630 had a total optical transmittance of about 93.6%, an optical haze of 4.01%, an optical clarity of 99.8%, a refractive index of 1.18, and a thickness of about 9 microns.

Curve 530 in FIG. 5 shows the plot that was generated by the Metricon prism coupler. Knee 512 in curve 530 corresponds to an index of 1.18 which was the index measured for the optical film.

EXAMPLE 6

Figure 8:
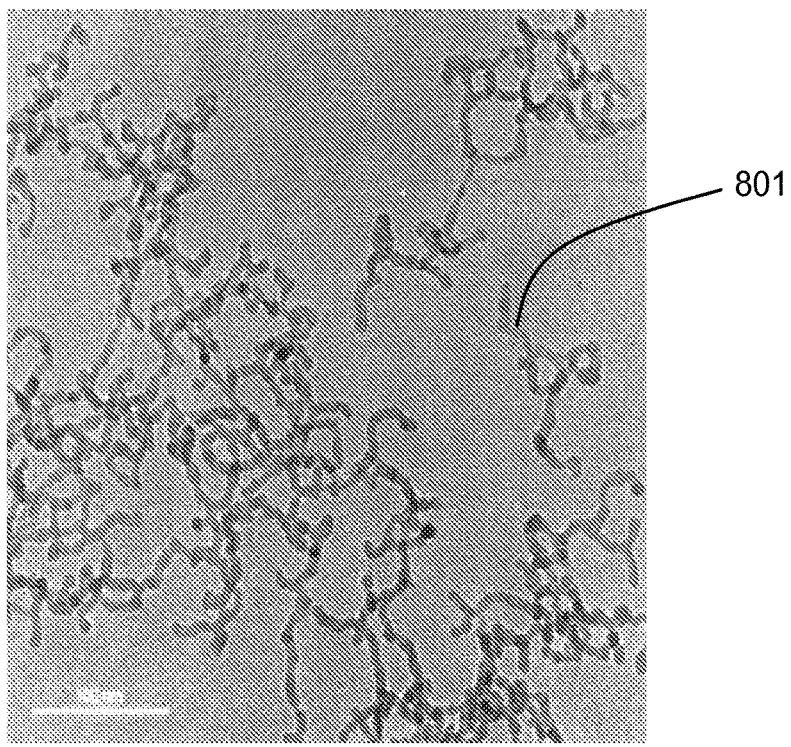
FIG. 8 is a TEM of elongated particles.

An optical construction similar to optical construction 600 was fabricated. First, a coating solution was made. In a 1 liter three-neck flask, equipped with a condenser and a thermometer, 400 grams of IPA-ST-UP organosilica elongated particles and 8 grams of deionized water were mixed under rapid stirring. The elongated particles had a diameter in a range from about 9 nm to about 15 nm and a length in a range of about 40 nm to about 100 nm. FIG. 8 is an exemplary transmission electron micrograph (TEM) of a plurality of such elongated particles 801. Particles 801 have winding or tortuous shapes. The elongated particles resemble long wires that are wound to have a tortuous shape. The average aspect ratio of the elongated particles is not less than about 5, or not less than about 10, or not less than about 20.

The particles were dispersed in a 15.2% wt IPA. Next, 9.6 grams of Silquest A-174 silane was added to the flask. The resulting mixture was stirred for 10 minutes. The mixture was kept at 81° C. for 12 hours. Next, the solution was allowed to cool down to room temperature. Next, about 200 grams of the solvent in the solution were removed using a rotary evaporator under a 40° C. water-bath, resulting in a 32.7% wt A-174-modified elongated silica clear dispersion in isopropyl alcohol.

Next, 94.1 grams of this clear dispersion, 20.5 grams of SR 444, 1.3 grams of photoinitiator Irgacure 184, 39.2 grams of 1-methoxy-2-propanol, and 17 grams of isopropyl alcohol were mixed together and stirred resulting in a homogenous coating solution.

Next, this solution was coated on a 0.051 mm (2 mil) thick PET substrate 610 using the coating method described in Example F except that the syringe-pump rate was 1.3 cc/min and the current to the LEDs was 13 Amps, resulting in a UV-A dose of 0.1352 joules per square cm. The resulting optical film 630 had a total optical transmittance of about 95.7%, an optical haze of 0.95%, an optical clarity of 100%, a refractive index of 1.19, and a thickness of about 5 microns.

Curve 510 in FIG. 5 shows the plot that was generated by the Metricon prism coupler. The rather sharp knee 512 in curve 510 corresponds to an index of 1.19 which was the index measured for the optical film.

Figure 9A:
FIGS. 9A-9C are exemplary SEMs of the top surface of an optical film at different magnifications.
Figure 9B:
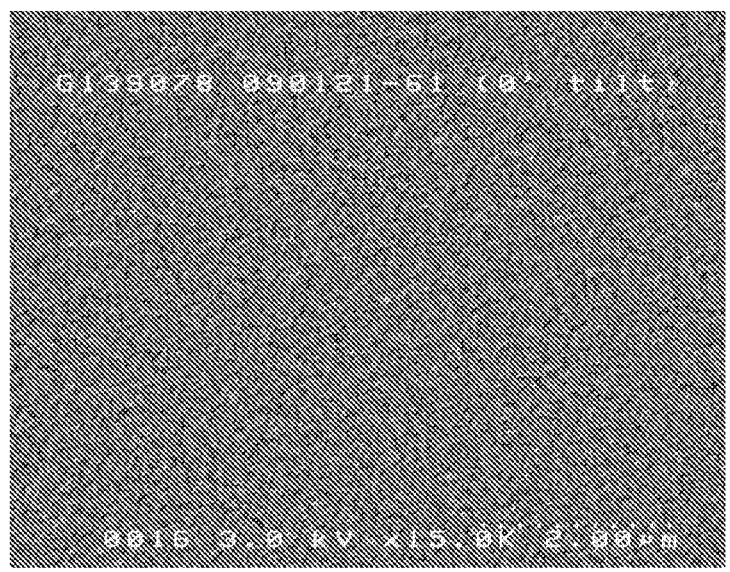
Figure 9C:
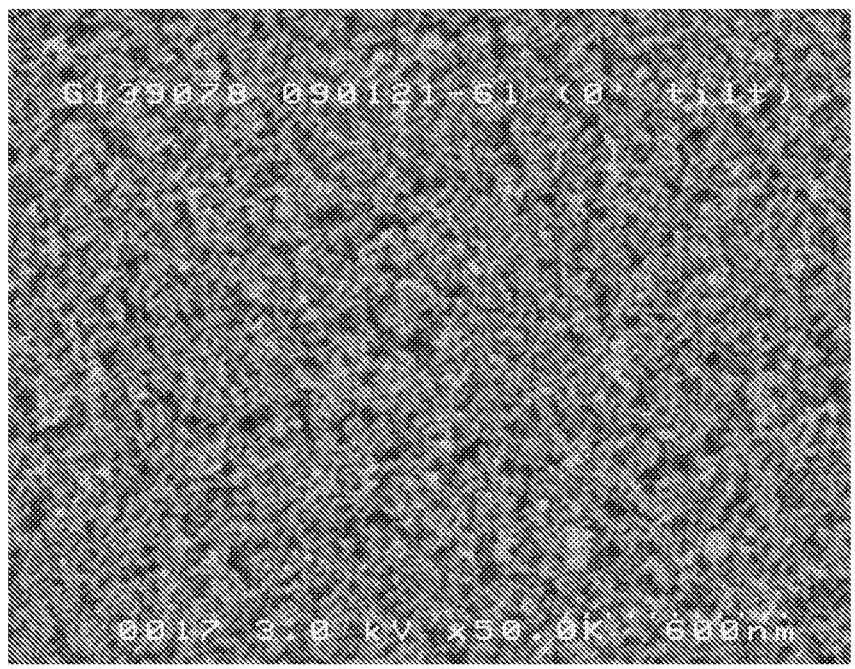
Figure 10A:
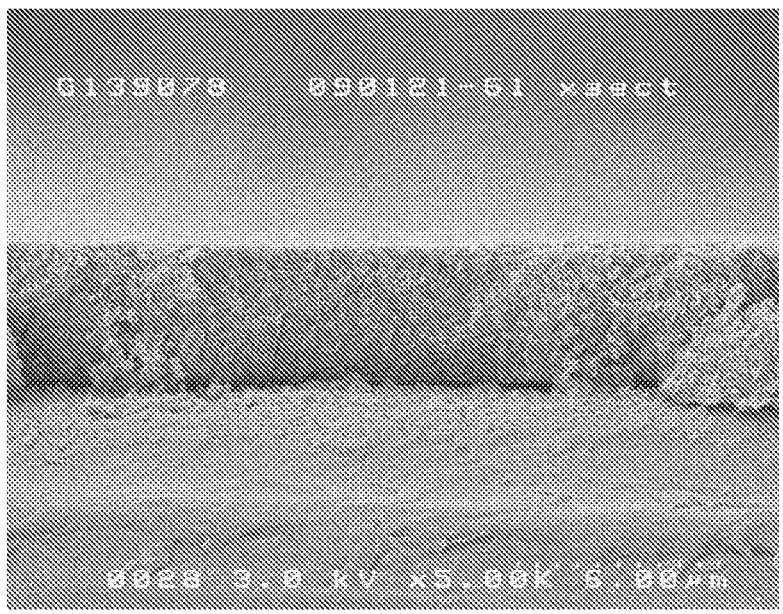
FIGS. 10A-10B are exemplary SEMs of a cross-section of the optical film in FIG. 9.
Figure 10B:
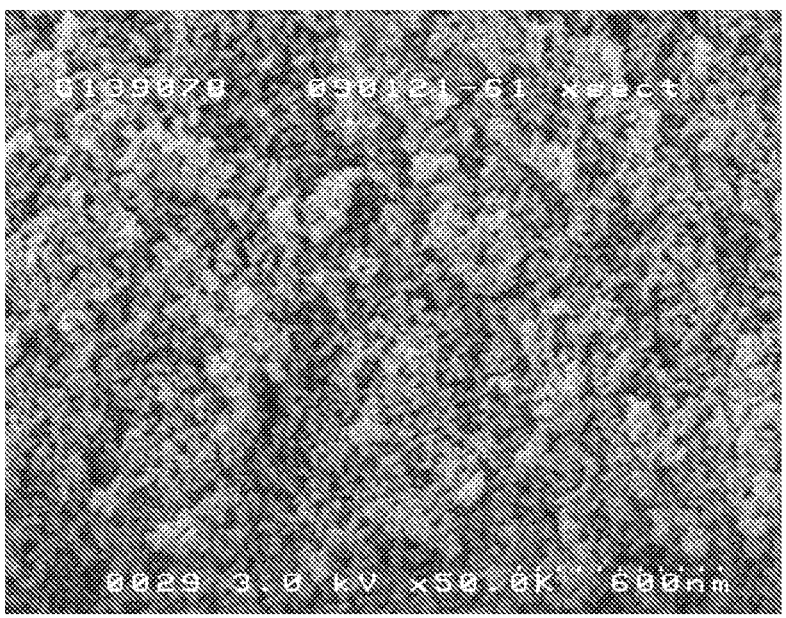

Scanning Electron Micrographs (SEMs) of the optical film were obtained. First, a representative sample of the optical film was selected. Next, the sample was frozen in liquid nitrogen. Then, the sample was fractured immediately after it was removed from the liquid nitrogen to expose a cross-section of the optical film along the thickness direction. Next, the sample was sputtered with an approximately 1 nm thick layer of a gold/palladium alloy to reduce electrical charging of the sample in subsequent processing. The top surface and the cross-section of the optical film were then imaged using a scanning electron microscope. FIGS. 9A-9C are three exemplary scanning electron micrographs of the top surface of the optical film at three different magnifications. FIGS. 10A-10B are two exemplary scanning electron micrographs of the cross-section of the optical film at two different magnifications. The voids in the optical film have an average void size less than about 50 nm. The particles in the optical film have an average diameter size of about 20 nm. In some cases, the particles in the optical film have an average diameter size of less than about 20 nm. The small void and particle diameters account for the optical film having high optical transmission, small optical haze, and high optical clarity. Furthermore, the measure refractive index of 1.19 reasonably represents the reduced effective index of the optical film. The optical film in this example, advantageously has a very high optical transmission and optical clarity, a very small optical haze and effective index.

EXAMPLE 7

An optical construction similar to optical construction 600 was fabricated. First, a coating solution was made according to Example D. Next, the 30% solids solution was coated on a 2 mil (0.051 mm) thick PET substrate 610 using the coating method described in Example E except that the syringe-pump rate was 2.3 cc/min and the current to the LEDs was 4 Amps, resulting in a UV-A dose of 0.116 joules per square cm. The resulting optical film 630 had a total optical transmittance of about 60%, an optical haze of 90%, an optical clarity of 99.4%, an effective refractive index of 1.19, and a thickness of about 7 microns.

Figure 11A:
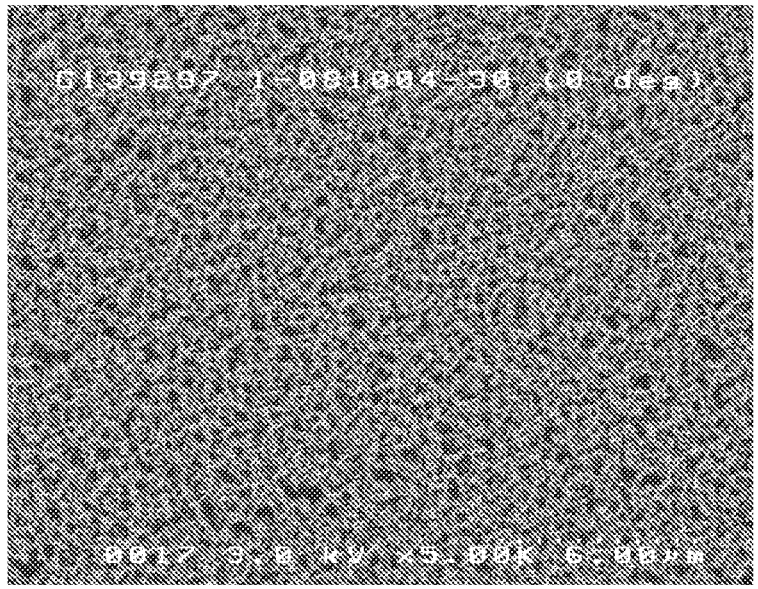
FIGS. 11A-11C are exemplary SEMs of the top surface of an optical film at different magnifications.
Figure 11B:
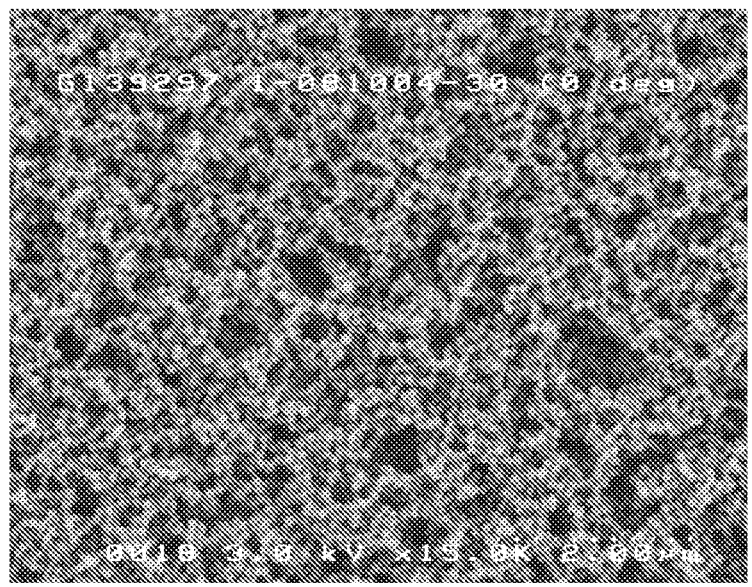
Figure 11C:
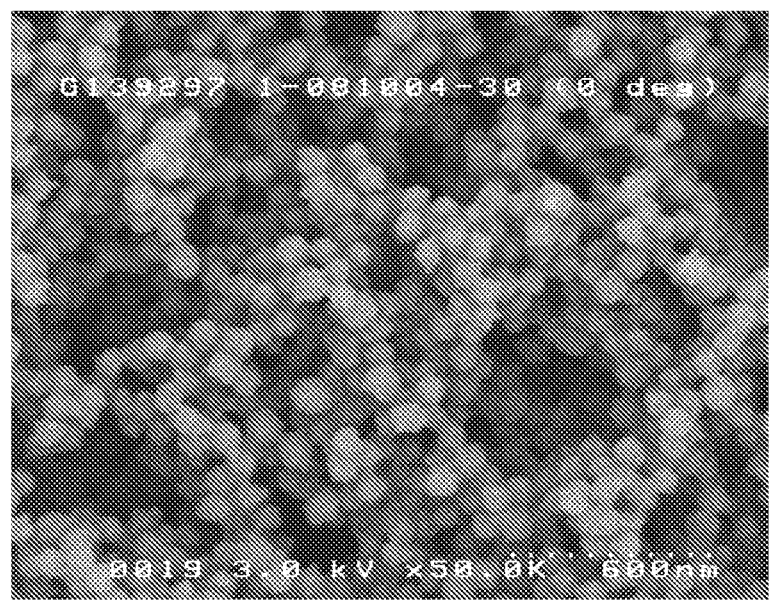
Figure 12A:
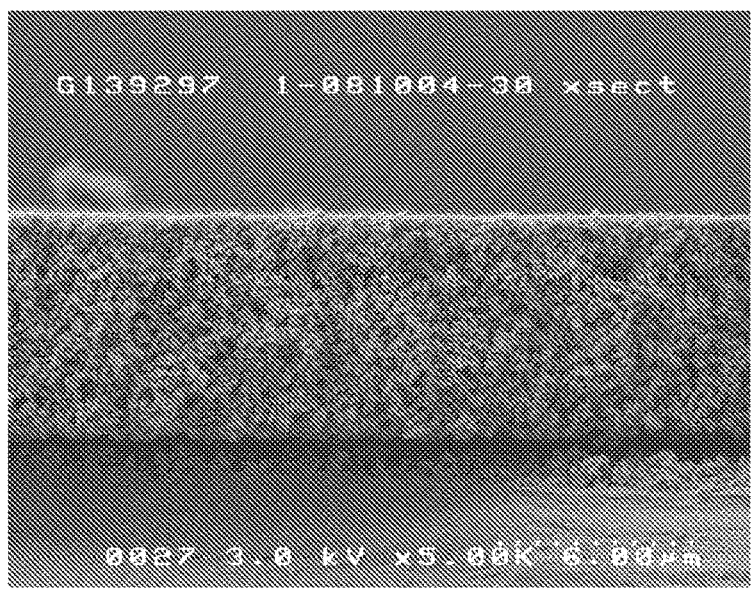
FIGS. 12A-12C are exemplary SEMs of a cross-section of the optical film in FIG. 11.
Figure 12B:
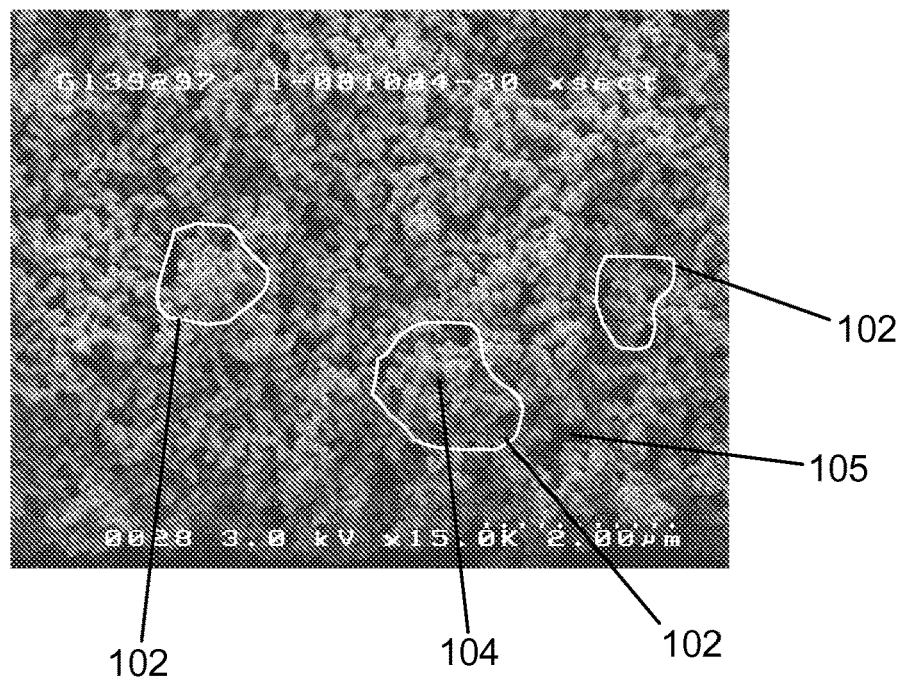
Figure 12C:
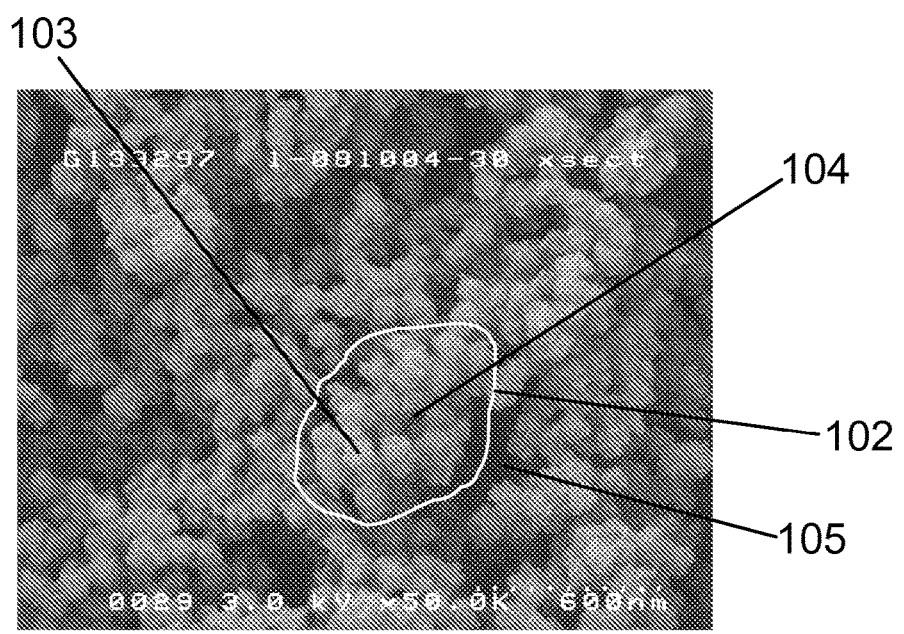
Figure 13A:
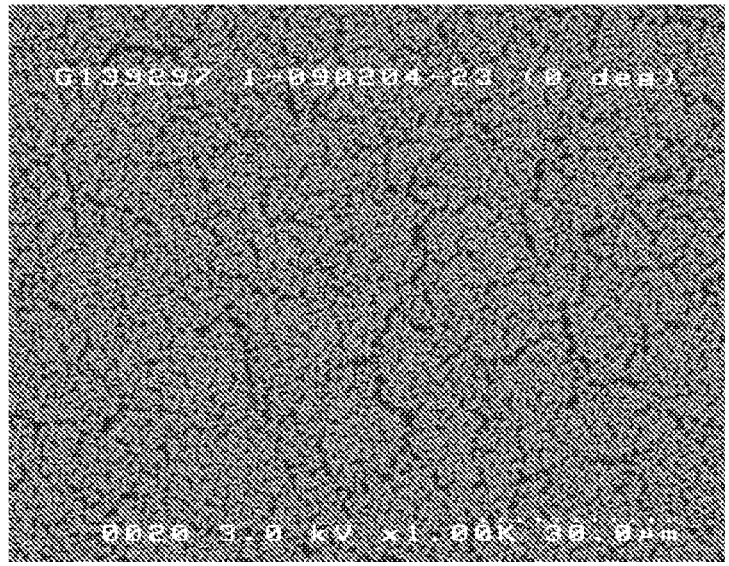
FIGS. 13A-13D are exemplary SEMs of the top surface of an optical film at different magnifications.
Figure 13B:
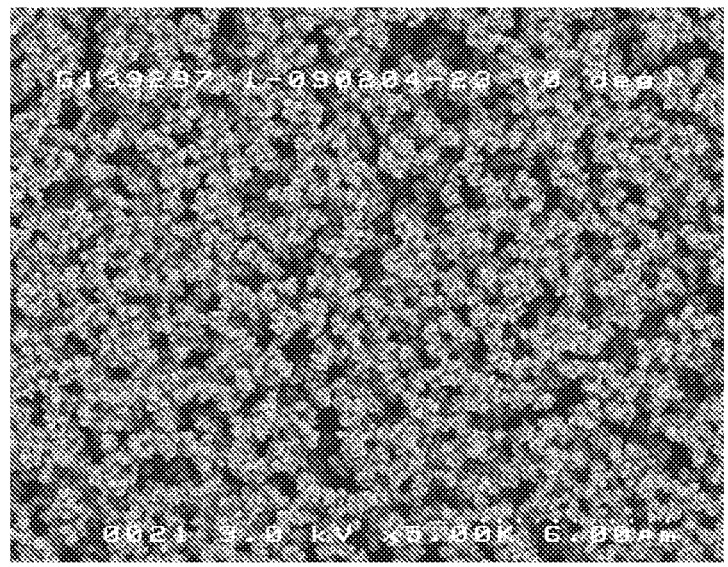
Figure 13C:
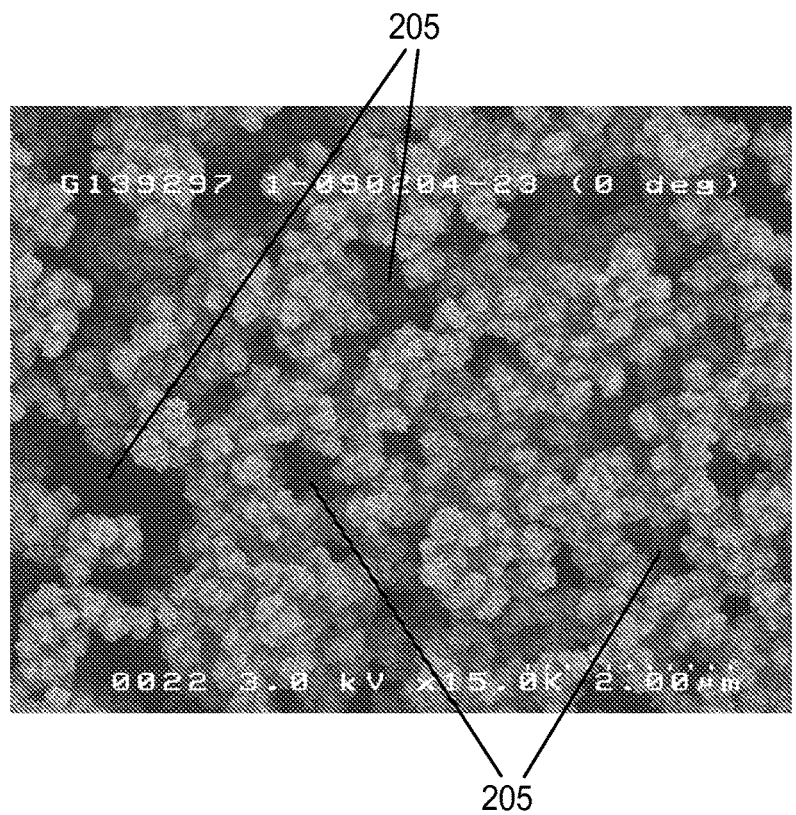
Figure 13D:
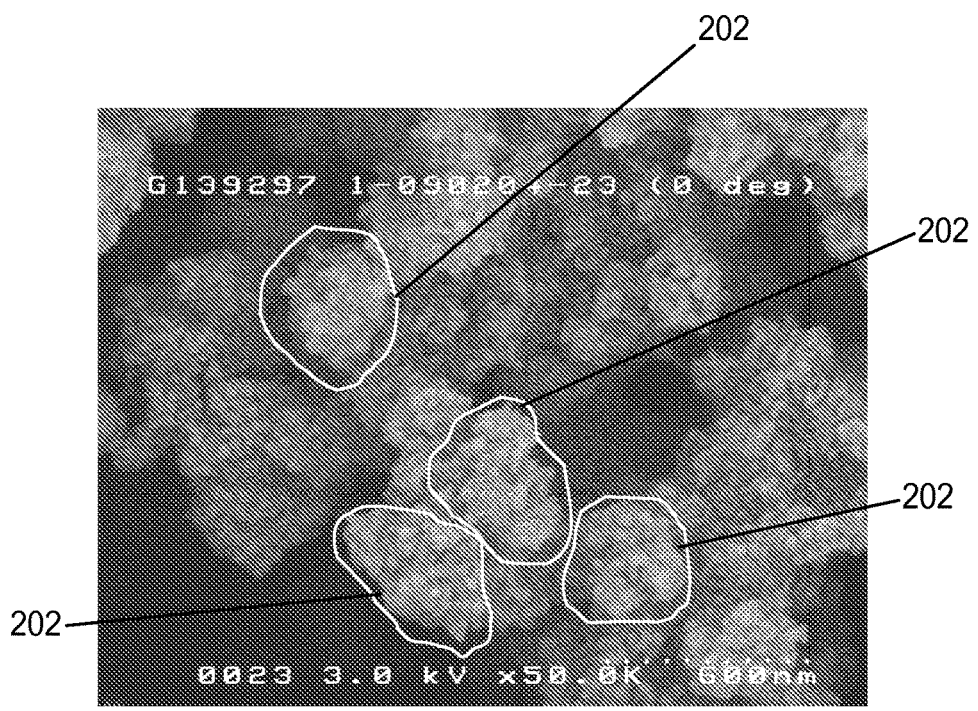
Figure 14A:
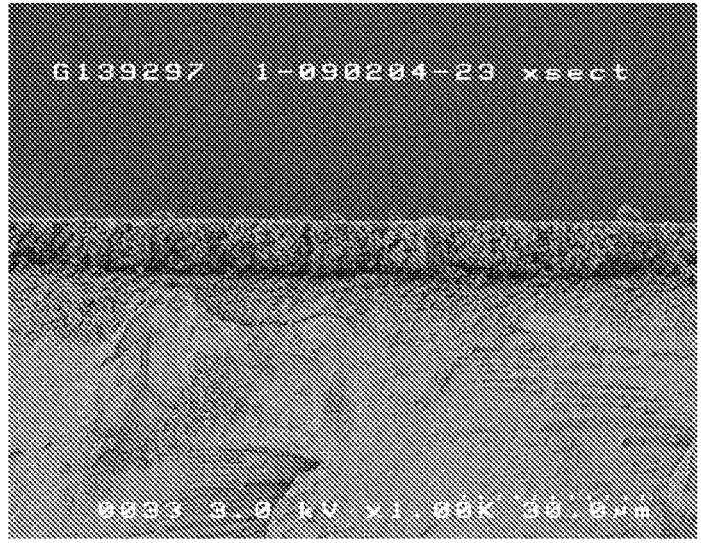
FIGS. 14A-14D are exemplary SEMs of a cross-section of the optical film in FIG. 13.
Figure 14B:
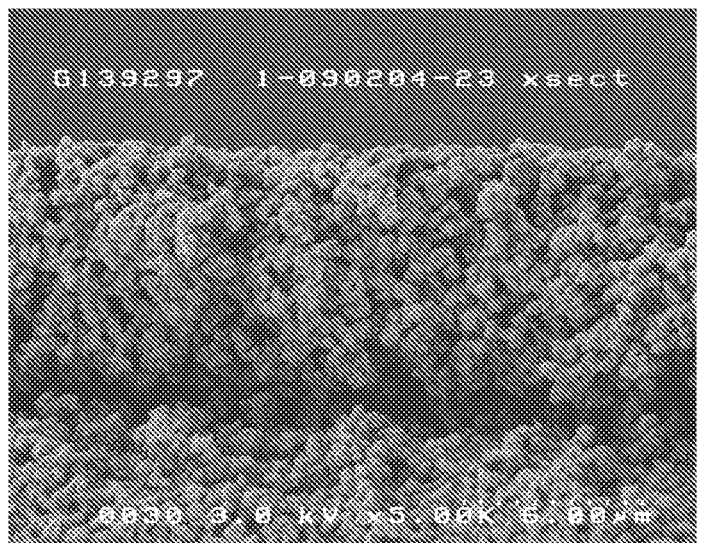
Figure 14C:
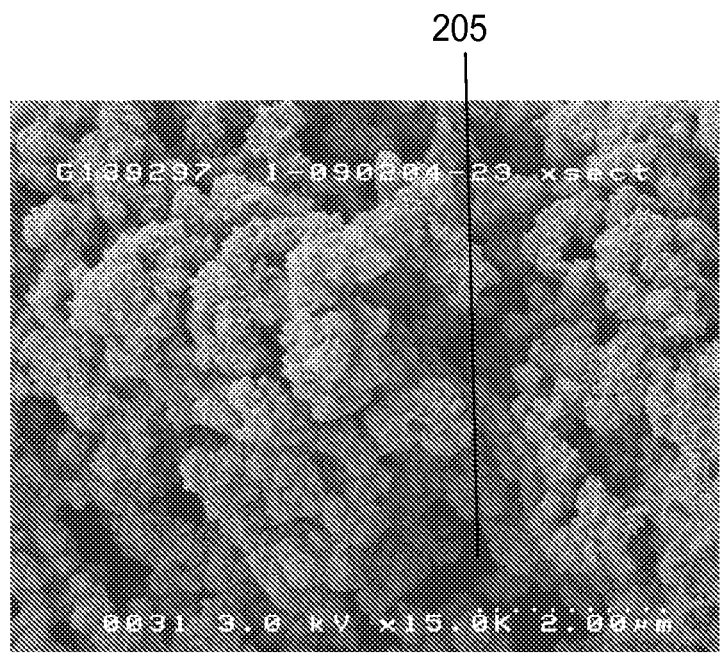
Figure 14D:
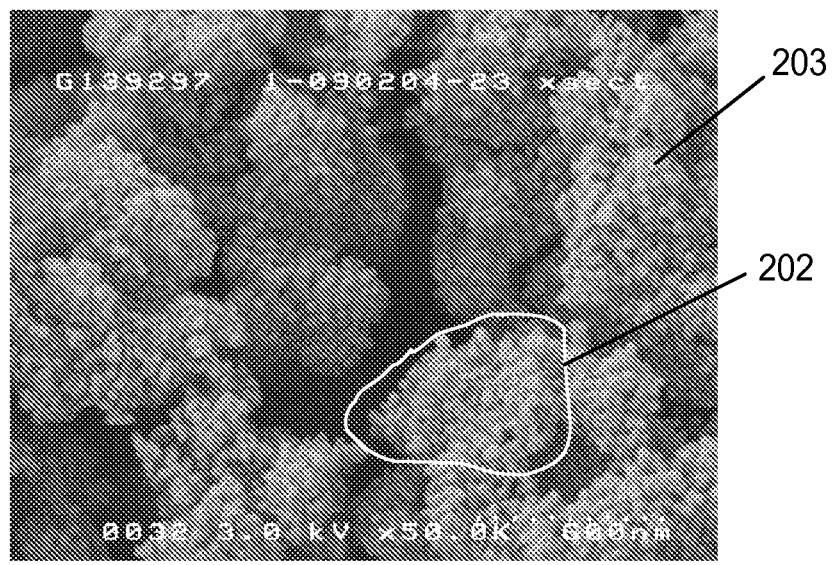
Figure 15A:
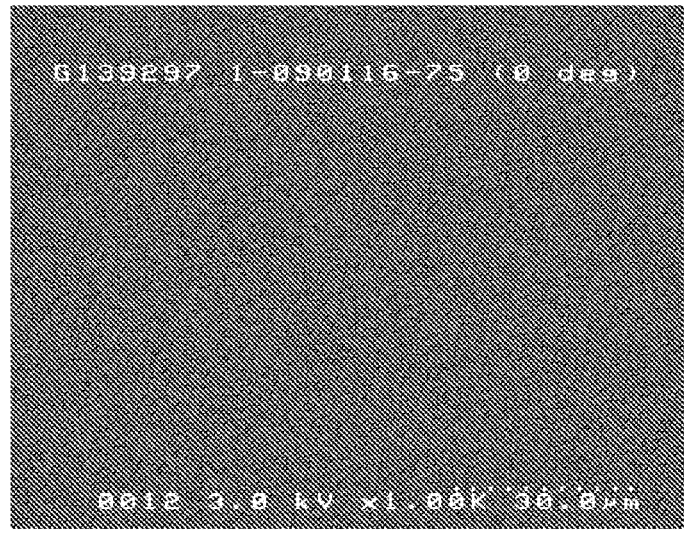
FIGS. 15A-15D are exemplary SEMs of the top surface of an optical film at different magnifications.
Figure 15B:
Figure 15C:
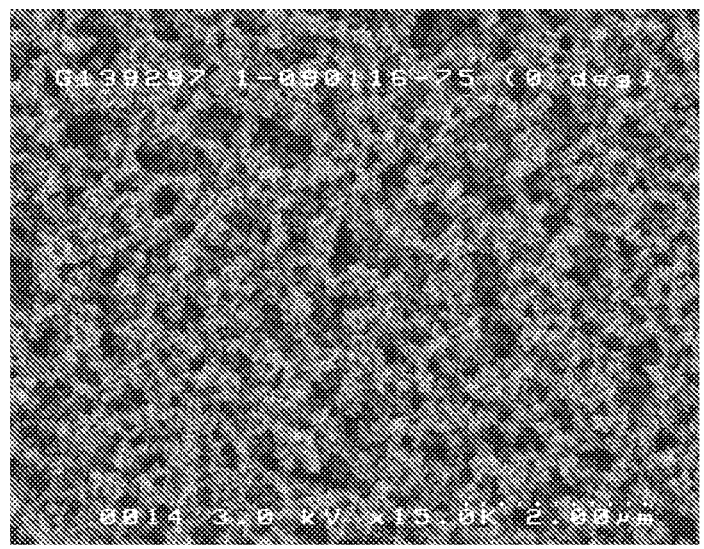
Figure 15D:
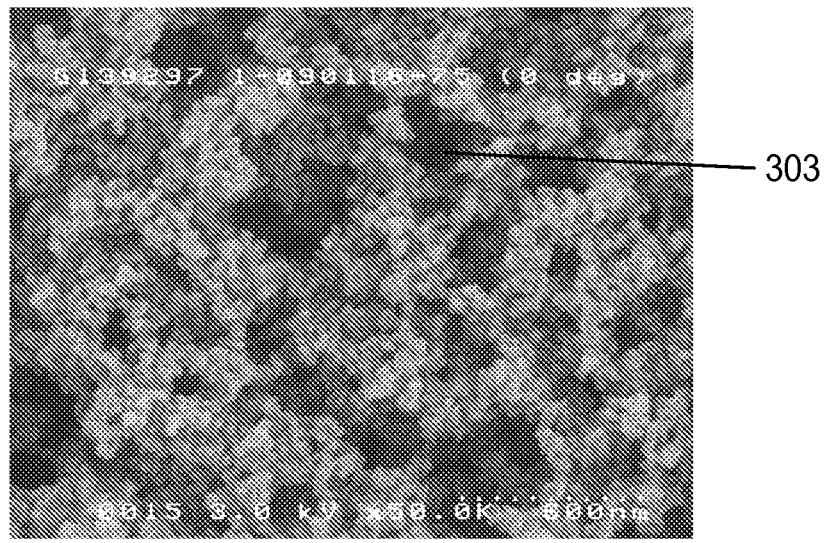

Scanning Electron Micrographs (SEMs) of the optical film were obtained using the procedure described in Example 6. FIGS. 11A-11C are three exemplary scanning electron micrographs of the top surface of the optical film at three different magnifications. FIGS. 12A-12C are three exemplary scanning electron micrographs of the cross-section of the optical film at three different magnifications. Particles 103 have aggregated or clumped into a plurality of interconnected porous clumps or clusters 102. In other words, the optical film includes a plurality of interconnected porous clumps or clusters 102. The clusters have irregular shapes. Each cluster includes a plurality of particles 103 that are coated with and connected to each other by the binder. The interconnected particles 103 in the cluster define a first plurality of voids 104 that are dispersed between the plurality of particles. The plurality of interconnected porous clusters define a second plurality of voids 105 that are dispersed between the plurality of the interconnected porous clusters. Voids 104 in the first plurality of voids have an average size that is less than about 50 nm, or less than about 40 nm, or less than about 30 nm, or less than about 20 nm.

Voids 105 in the second plurality of voids have an average size that is in a range from about 20 nm to about 1000 nm, or in a range from about 50 nm to about 700 nm, or in a range from about 70 nm to about 700 nm, or in a range from about 100 nm to about 700 nm, or in a range from about 100 nm to about 500 nm.

Particles 103 in the plurality of particles have an average size that is less than about 100 nm, or less than about 80 nm, or less than about 60 nm, or less than about 50 nm, or less than about 40 nm, or less than about 30 nm, or less than about 20 nm.

Clusters 102 in the plurality of interconnected porous clusters have an average size that is less than about 2000 nm, or less than about 1500 nm, or less than about 1200 nm, or less than about 1000 nm, or less than about 800 nm.

The optical film has an optical haze and an optical clarity, each of which is greater than about 40%, or greater than about 50%, or greater than about 60%, or greater than about 70%, or greater than about 80%, or greater than about 90%, or greater than about 95%. The optical film has such high optical haze and clarity even if the thickness of the optical film is no less than about 1 micron, or no less than about 2 microns, or no less than about 3 microns, or no less than about 4 microns.

The optical film in this example, advantageously has a very high optical haze and, at the same time, a very high optical clarity. The optical film includes a plurality of interconnected porous clusters, where each cluster includes a plurality of particles. Furthermore, the optical film has a thickness that is greater than about 1 micron, an optical haze that is greater than about 50%, and an optical clarity that is greater than about 50%.

Some of the disclosed optical films, such as the optical films in this example, can be regarded as an optical volume diffuser. The volume diffuser includes a first plurality of particles and a second plurality of voids, where each void is dispersed throughout the optical volume diffuser including throughout the thickness of the optical volume diffuser. The volume diffuser further has an optical haze and an optical clarity, each of which is not less than about 50%, or not less than about 60%, or not less than about 70%, or not less than about 80%, or not less than about 90%, or not less than about 95%. At least in some cases, the voids in the second plurality of voids are interconnected.

EXAMPLE 8

An optical construction similar to optical construction 600 was fabricated. First, a coating solution was made according to Example C.

Next, this solution was coated on a 2 mil (0.051 mm) thick PET substrate 610 using the coating method described in Example F except that the current to the LEDs was 13 Amps, resulting in a UV-A dose of 0.1352 joules per square cm. The resulting optical film 630 had a total optical transmittance of about 71.8%, an optical haze of 55.4%, an optical clarity of 99.7%, and a thickness of about 7 microns.

Curve 540 in FIG. 5 shows the plot that was generated by the Metricon prism coupler. Unlike curves 510, 520, and 530, curve 540 did not have a sufficiently sharp knee required to measure the index of refraction of the optical film with sufficient accuracy.

EXAMPLE 9

An optical construction similar to optical construction 600 was fabricated. First, a coating solution was made. In a 2 liter three-neck flask, 401.5 grams of Nalco 2327 silica particles, 11.9 grams of Trimethoxy (2,4,4 trimethypentyl) silane, 11.77 grams of (Triethoxysilyl)propionitrile, and 450 grams of 1-methoxy-2-propanol were mixed together and stirred. The jar was sealed and heated at 80° C. for 16 hours. Next, 100 grams of this solution and 30 grams of SR444 were added to a 250 milliliter round-bottom flask. The solvents in the solution were removed by rotary evaporation. Next, 10 grams of isopropanol was added to the flask. Next, 20 grams of 1-methoxy-2-propanol, 40 grams of isopropanol, 0.125 grams of Irgcure 819, and 1.25 grams of Irgcure 184 were added to the solution, resulting in a 30% by weight coating solution.

This solution was then coated according to Example F on a 2 mil (0.051 mm) thick PET substrate 610, excrept that the syringe flow rate was 6 cc/min and the current to the LEDs was 13 Amps, resulting in a UV-A dose of 0.1352 joules per square cm.

The resulting optical film 630 had a total optical transmittance of about 52%, an optical haze of 100%, an optical clarity of 4%, and a thickness of about 8 microns.

Curve 550 in FIG. 5 shows the plot that was generated by the Metricon prism coupler. Unlike curves 510, 520, and 530, curve 550 did not have a sufficiently sharp knee required to measure the index of refraction of the optical film with sufficient accuracy.

Scanning Electron Micrographs (SEMs) of the optical film were obtained using the procedure described in Example 6. FIGS. 13A-13D are four exemplary scanning electron micrographs of the top surface of the optical film at four different magnifications. FIGS. 14A-14D are four exemplary scanning electron micrographs of the cross-section of the optical film at four different magnifications. The particles have aggregated or clumped into a plurality of interconnected clumps or clusters 202. In other words, the optical film includes a plurality of interconnected clumps or clusters 202. The clusters have irregular shapes. Each cluster includes a plurality of particles 203 that are coated with and connected to each other by the binder. Some clusters include a few voids, but the average size of these voids is less than about 10 nm. The plurality of interconnected clusters define a plurality of voids 205 that are dispersed between the plurality of the interconnected clusters.

The clusters have an average size that is not less than about 500 nm, or not less than about 600 nm, or not less than about 700 nm, or not less than about 800 nm, or not less than about 900 nm, or not less than about 1000 nm. The voids have an average size that is not less than about 500 nm, or not less than about 700 nm, or not less than about 900 nm, or not less than about 1000 nm, or not less than about 1200 nm, or not less than about 1500 nm.

The optical film has an optical haze that is not less than about 50% and an optical clarity that is not greater than about 50%, or an optical haze that is not less than about 60% and an optical clarity that is not greater than about 40%, or an optical haze that is not less than about 70% and an optical clarity that is not greater than about 30%, or an optical haze that is not less than about 80% and an optical clarity that is not greater than about 20%, or an optical haze that is not less than about 90% and an optical clarity that is not greater than about 10%, or an optical haze that is not less than about 95% and an optical clarity that is not greater than about 5%. The optical film in this example, advantageously has a very high optical haze and a very low optical clarity.

Figure 18:
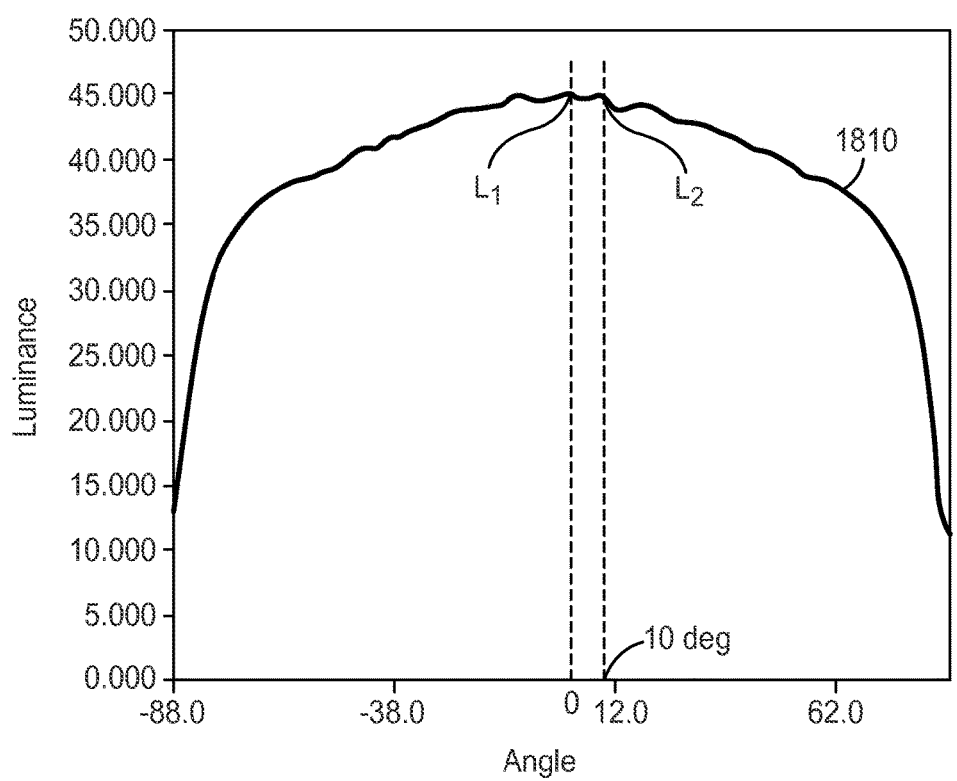
FIG. 18 represents the scattering characteristics of an optical film having high optical haze and low optical clarity.

FIG. 18 shows the scattering characteristics of an optical film, such as the optical film of Example 9, having high optical haze and low optical clarity. In particular, curve 1810 is the scattered light luminance as a function of scattering angle for normally incident light. Luminance plot 1810 is substantially flat and broad. For example, the ratio of the on-axis (zero degrees) luminance $L_1$ to the luminance $L_2$ at 10 degrees is about 1.

In some cases, an optical film disclosed herein has an optical haze that is not less than about 80%, or not less than about 85%, or not less than about 90%, or not less than about 95%, and an optical clarity that is not greater than about 20%, or not greater than about 15%, or not greater than about 10%, or not greater than about 5%. In such cases, when the optical film scatters a normally incident light, the scattered light has a luminance $L_1$ at zero degrees and a luminance $L_2$ at 10 degrees, where $L_1/L_2$ is not greater than about 5, or not greater than about 5, or not greater than about 4, or not greater than about 3, or not greater than about 2, or not greater than about 1.5, or not greater than about 1.4, or not greater than about 1.3, or not greater than about 1.2, or not greater than about 1.1.

EXAMPLE 10

An optical construction similar to optical construction 600 was fabricated. First, a coating solution B as described in Example B was made. This solution was then coated, using the coating process described in Example E, on a 2 mil (0.051 mm) thick PET substrate 610. The resulting optical film 630 had a total optical transmittance of about 94.3%, an optical haze of 2.1%, an optical clarity of 99.6%, a refractive index of 1.22, and a thickness of about 8 microns.

Scanning Electron Micrographs (SEMs) of the optical film were obtained. First, a representative sample of the optical film was selected. The sample was then mounted, top-face-side up, on a pin stub using a carbon filled sticky pad. Next, the mounted sample was sputtered with an approximately 1 nm thick layer of a gold/palladium alloy to reduce electrical charging of the sample in subsequent processing. Next, about 1 micron thick platinum was deposited on the top surface of the sample to protect the surface and to reduce the "curtaining" appearance during subsequent milling. The platinum coating approximately covered a 1.5 micron by 1.5 micron rectangular area. The sample was then etched with a focused ion beam using an FEI Quanta 200 3D Dual-beam tool (available from FEI Company, Hillsboro, Oreg.). The etching beam was a 30 kV, 5 nanoAmp gallium ion beam. The ion beam was used to etch an approximately 10 micron deep trench along the thickness direction of the sample and perpendicular to the top surface of the sample. The trench was then re-etched several times, each time with a lower energy gallium ion beam. The last re-etching of the trench was done with a 0.1 nanoAmp gallium ion beam. Next, a vertical side of the trench was imaged using a Field Emission Scanning Electron Microscope (FE-SEM, also available from FEI Company).

Figure 6A:
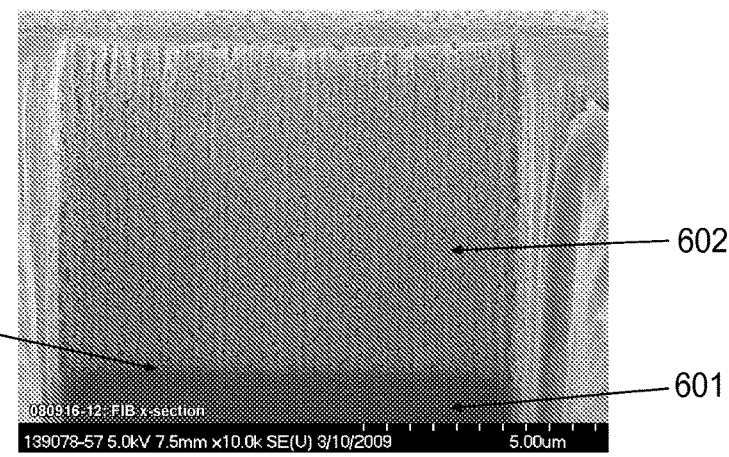
FIGS. 6A-6C are exemplary SEMs of an optical film at different magnifications.
Figure 6B:
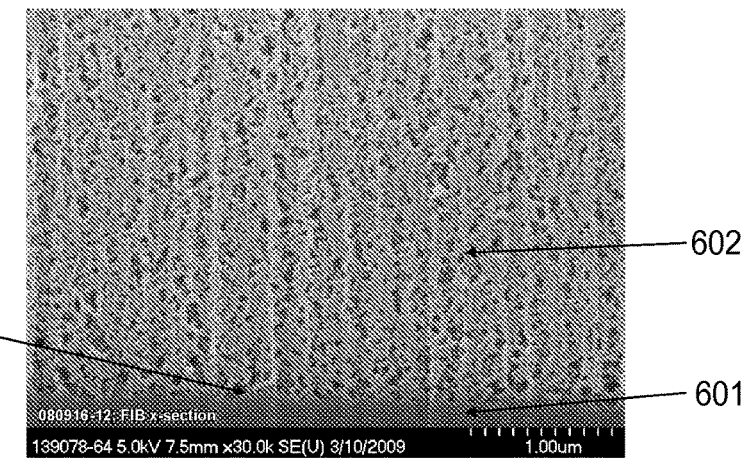
Figure 6C:
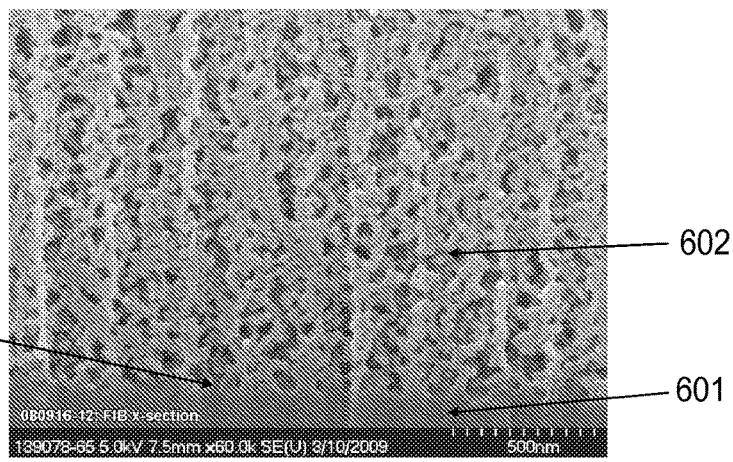

FIGS. 6A-6C are three exemplary scanning electron micrographs of the optical film at three different magnifications. Area 601 is the substrate portion of the trench and area 602 is the optical film portion of the trench. The silica particles used in making the optical film had an average diameter of about 20 nm. The particles shown in FIGS. 6A-6C, however, have a larger average diameter (about 50 nm). The larger particle diameter seen in the figures can be explained by the binder coating the particles and forming strings of the coated particles, where the strings form a porous scaffold of binder coated particles.

The voids are less than about 50 nm and are uniformly dispersed throughout the thickness of the film including near and at interface 603 between the film and the substrate. That the small voids primarily reduce the effective index of the optical film is further confirmed by the small index (1.22) of the film as measured by the Metricon prism coupler. The small size of the voids further accounts for the small optical haze and large optical clarity of the optical film. Many of the voids are elongated along the general thickness direction of the optical film with aspect ratios in a range from about 1.5 to about 10.

EXAMPLE 11

An optical construction similar to optical construction 600 was fabricated. First, a coating solution B as described in Example B was made. This solution was then coated, using the coating process described in Example E, on a 2 mil (0.051 mm) thick PET substrate 610. The resulting optical film 630 had a total optical transmittance of about 93.9%, an optical haze of 2.3%, an optical clarity of 99.5%, a refractive index of 1.19, and a thickness of about 9 microns.

Figure 7A:
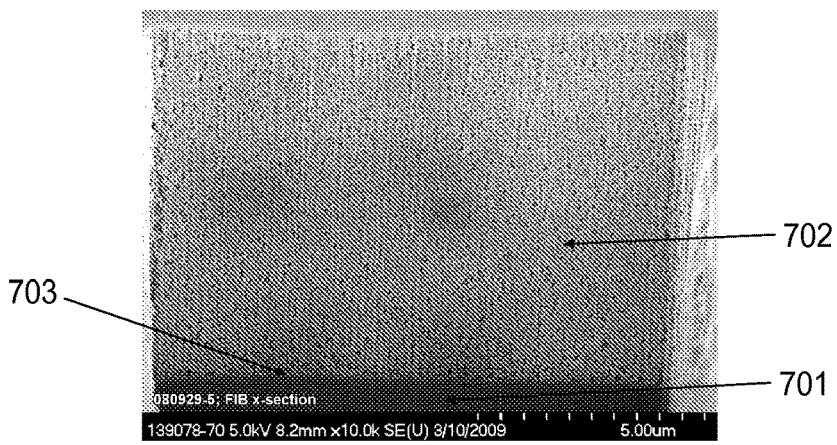
FIGS. 7A-7C are exemplary SEMs of another optical film at different magnifications.
Figure 7B:
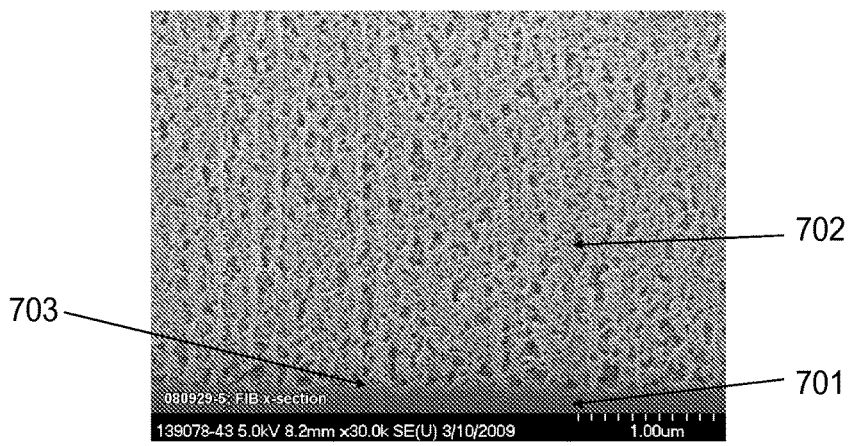
Figure 7C:
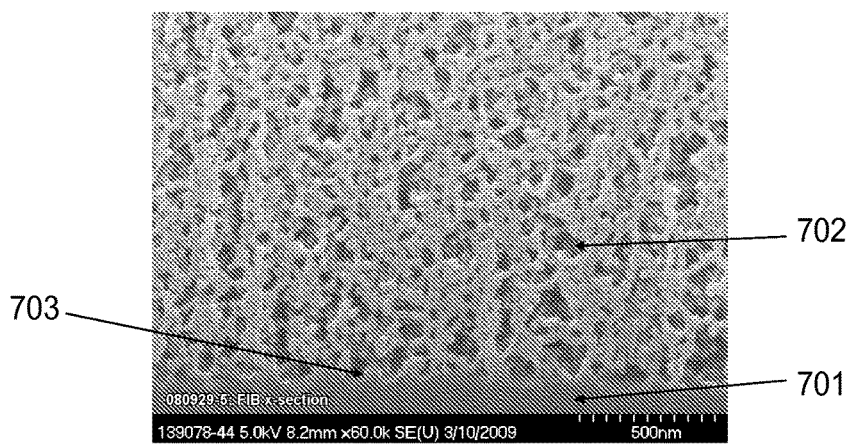

Scanning Electron Micrographs (SEMs) of the optical film were obtained using the procedure outlined in Example 10. FIGS. 7A-7C three exemplary scanning electron micrographs of the optical film at three different magnifications. Area 701 is the substrate portion of the trench and area 702 is the optical film portion of the trench. The silica particles used in making the optical film had an average diameter of about 20 nm. The particles shown in FIGS. 7A-7C, however, have a larger average diameter (about 50 nm). The larger particle diameter seen in the figures can be explained by the binder coating the particles and forming strings of the coated particles, where the strings form a porous scaffold of binder coated particles.

The voids are less than about 50 nm and are uniformly dispersed throughout the thickness of the film including near and at interface 703 between the film and the substrate. That the small voids primarily reduce the effective index of the optical film is further confirmed by the small index (1.19) of the film as measured by the Metricon prism coupler. The small size of the voids further accounts for the small optical haze and large optical clarity of the optical film. Many of the voids are elongated along the general thickness direction of the optical film with aspect ratios in a range from about 1.5 to about 10.

EXAMPLE 12

An optical construction similar to optical construction 600 was fabricated. First, a coating solution was made. 200 grams of 20 nm silica particles (Nalco 2327), and 10.16 g of Phenyltrimethoxy silane and 225.5 g of 1-methoxy-2-propanol (both available from Aldrich Chemical, Milwaukee, Wis.) were added to a 1 quart jar wile stirring. The jar was then sealed and heated to 80° C. for 16 hours. Next, 150 grams of this solution were mixed with 45 grams of SR444 and 0.85 g of a 5% solution of Phenothiazine in 1-methoxy-2-propanol (both available from Aldrich Chemical, Milwaukee, Wis.). Next, the water and 1-methoxy-2-propanol were removed from the mixture via rotary evaporation resulting in a total weight of 85.8 g. Next, 15.5 g of Ethyl acetate was added to the solution. Next, the solution was diluted to 30% solids by adding 104.9 g of isopropyl alcohol, 42 grams of 1-methoxy-2-propanol, and 1.86 grams of Irgacure 184.

This solution was then coated according to Example F on a 2 mil (0.051 mm) thick PET substrate 610, except that the syringe flow rate was 4.6 cc/min and the current to the LEDs was 4 Amps, resulting in a UV-A dose of 0.042 joules per square cm.

The resulting optical film 630 had a total optical transmittance of about 59.4%, an optical haze of 93.5%, an optical clarity of 99.4%, and a thickness of about 7 microns.

Figure 19:
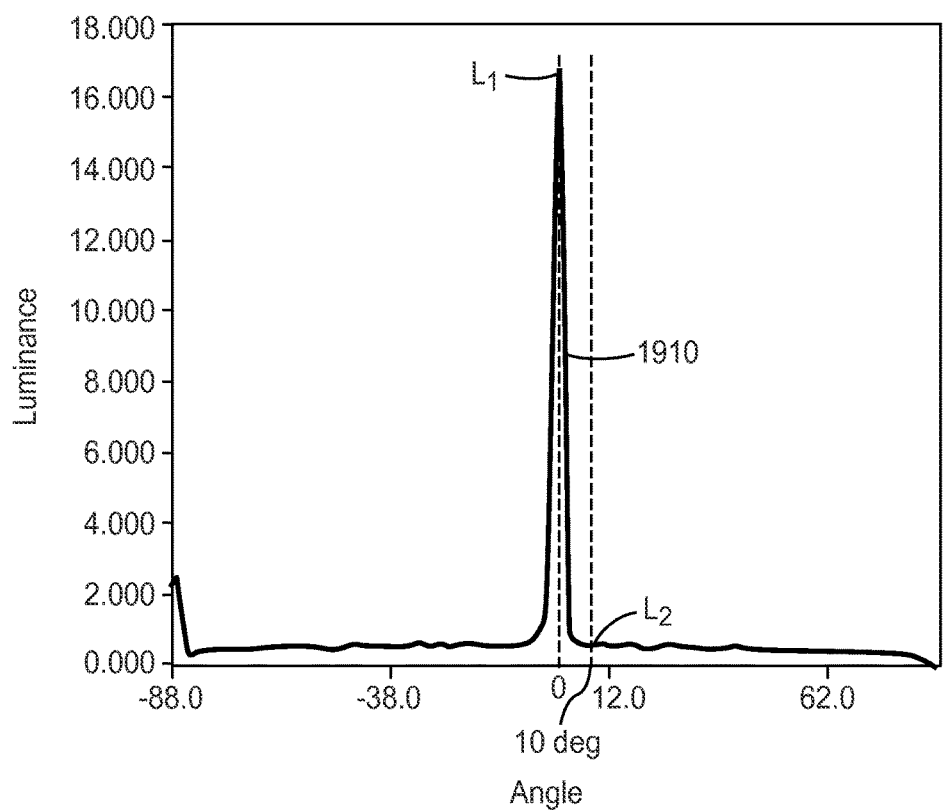
FIG. 19 represents the scattering characteristics of an optical film having high optical haze and high optical clarity.

FIG. 19 shows the scattering characteristics of an optical film, such as the optical film of Example 12, having high optical haze and high optical clarity. In particular, curve 1910 is the scattered light luminance as a function of scattering angle for normally incident light. Luminance plot 1910 includes a sharp spike at zero degrees and a broad background scattered light. For example, the ratio of the on-axis (zero degrees) luminance $L_1$ to the luminance $L_2$ at 10 degrees is about 17.

In some cases, an optical film disclosed herein has an optical haze that is not less than about 80%, or not less than about 85%, or not less than about 90%, or not less than about 95%, and an optical clarity that is not less than about 80%, or not less than about 85%, or not less than about 90%, or not less than about 95%. In such cases, when the optical film scatters a normally incident light, the scattered light has a luminance $L_1$ at zero degrees and a luminance $L_2$ at 10 degrees, where $L_1/L_2$ is not less than about 5, or not less than about 10, or not less than about 20, or not less than about 50, or not less than about 100.

EXAMPLE 13

An optical construction similar to optical construction 600 was fabricated. First, a coating solution "C" was made by mixing 25 g of a coating solution prepared as described in Example B and 75 g of a coating solution prepared as described in Example 9.

This solution was then coated according to Example F on a 2 mil (0.051 mm) thick PET substrate 610, except that the current to the LEDs was 13 Amps, resulting in a UV-A dose of 0.1352 joules per square cm.

The resulting optical film 630 had a total optical transmittance of about 74.5%, an optical haze of about 55.4%, an optical clarity of about 99.7%, and a thickness of about 7 microns.

Figure 16A:
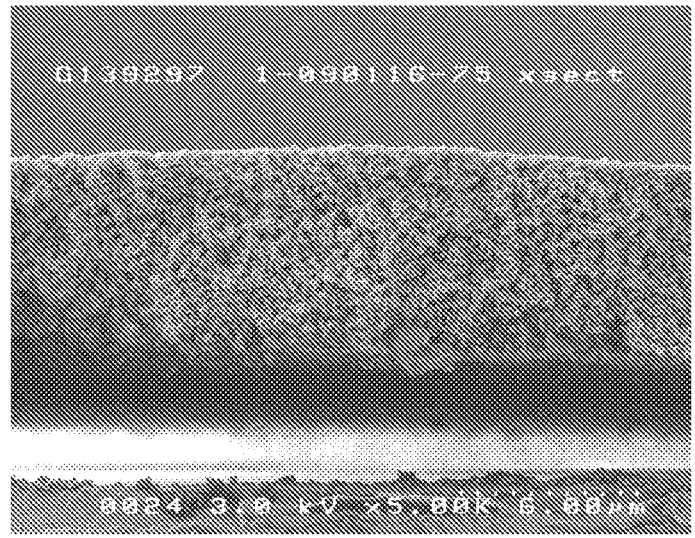
FIGS. 16A-16C are exemplary SEMs of a cross-section of the optical film in FIG. 15.
Figure 16B:
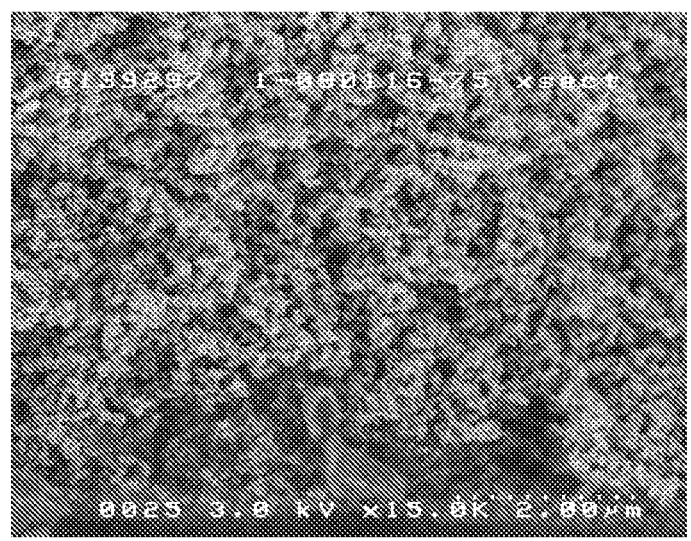
Figure 16C:
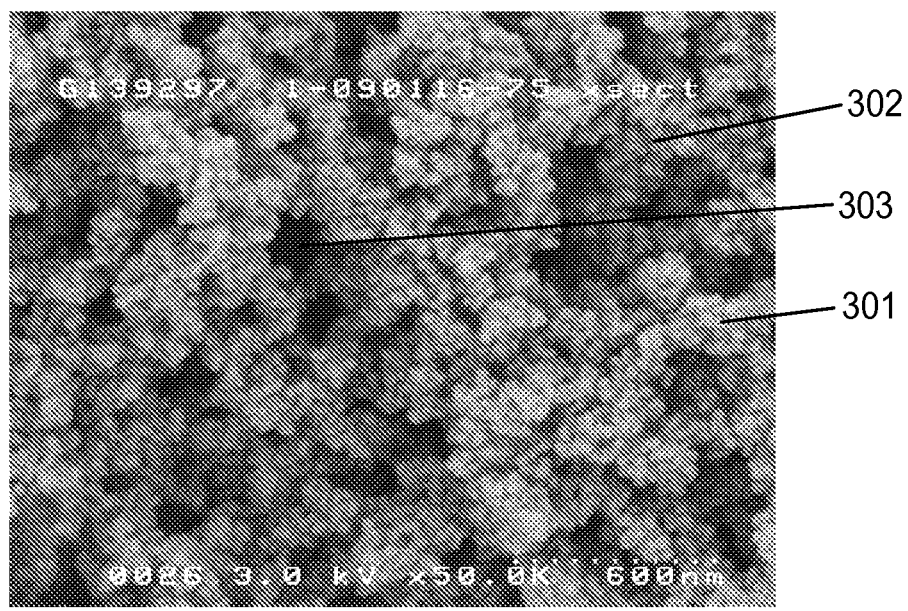

Scanning Electron Micrographs (SEMs) of the optical film were obtained using the procedure described in Example 6. FIGS. 15A-15D are four exemplary scanning electron micrographs of the top surface of the optical film at four different magnifications. FIGS. 16A-16C are three exemplary scanning electron micrographs of the cross-section of the optical film at three different magnifications. Particles 301 are coated and interconnected by the binder used to make the optical film. The interconnected particles form a network or an scaffold 302 that is dispersed substantially uniformly throughout the optical film. Network 302 defines a plurality of interconnected voids 303. The voids have an average size that is in a range from about 50 nm to about 500 nm, or in a range from about 100 nm to about 300 nm.

The thickness of the optical film is not less than about 1 micron, or not less than about 2 microns, or not less than about 3 microns, or not less than about 4 microns. In some cases, the optical haze of the optical film is in a range from about 10% to about 80% and the optical clarity of the optical film is not less than about 70%. In some cases, the optical haze of the optical film is in a range from about 20% to about 70% and the optical clarity of the optical film is not less than about 80%. In some cases, the optical haze of the optical film is in a range from about 20% to about 70% and the optical clarity of the optical film is not less than about 90%. In some cases, the optical haze of the optical film is in a range from about 20% to about 70% and the optical clarity of the optical film is not less than about 95%. In some cases, the optical haze of the optical film is in a range from about 30% to about 70% and the optical clarity of the optical film is not less than about 95%.

EXAMPLE 14

First, a coating solution was made. In a 2 liter three-neck flask, equipped with a condenser and a thermometer, 960 grams of IPA-ST-UP organosilica elongated particles (available from Nissan Chemical Inc., Houston, Tex.), 19.2 grams of deionized water, and 350 grams of 1-methoxy-2-propanol were mixed under rapid stirring. The particles were dispersed in a 15.2% wt IPA. Next, 22.8 grams of Silquest A-174 silane (available from GE Advanced Materials, Wilton, Conn.) was added to the flask. The resulting mixture was stirred for 30 minutes.

The mixture was then kept at 81° C. for 16 hours. Next, the solution was allowed to cool down to room temperature. Next, about 950 grams of the solvent in the solution were removed using a rotary evaporator under a 40° C. water-bath, resulting in a 41.7% wt A-174-modified elongated silica clear dispersion in 1-methoxy-2-propanol.

Next, 407 grams of this clear dispersion, 165.7 grams of SR 444 (available from Sartomer Company, Exton, Pa.), 8.28 grams of photoinitiator Irgacure 184 and 0.828 grams of photoinitiator Irgacure 819 (both available from Ciba Specialty Chemicals Company, High Point N.C.), and 258.6 grams of isopropyl alcohol were mixed together and stirred resulting in a homogenous coating solution of 40% solids.

Figure 17:
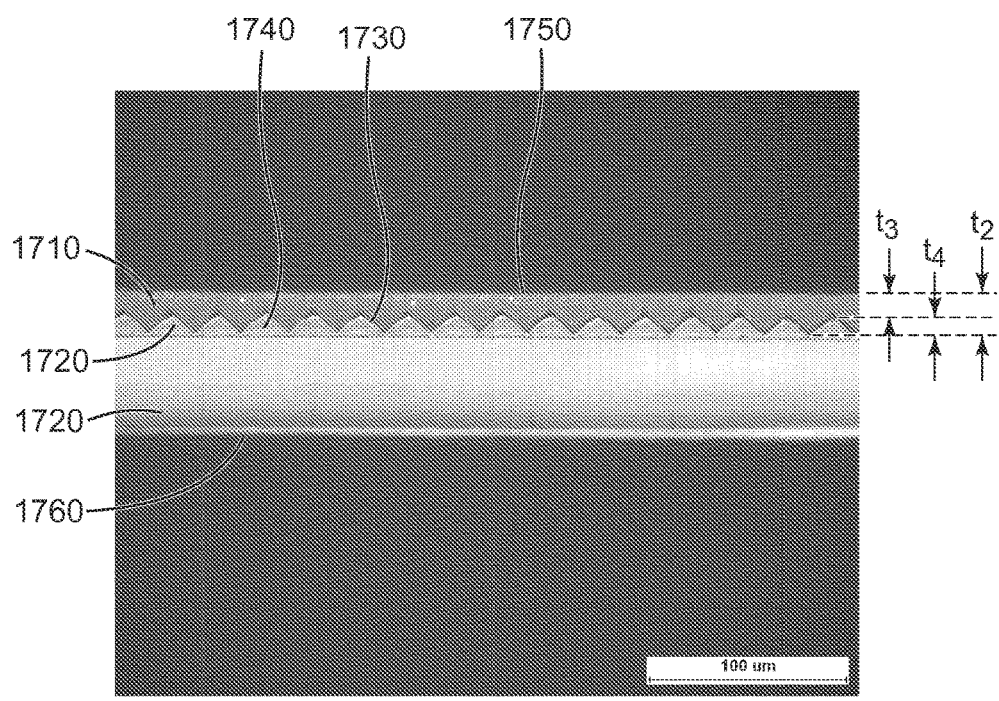
FIG. 17 is an optical micrograph of a cross-section of a planarized optical construction.

Next, the 40% solids solution was coated on the prism side of a light redirecting film available as BEF from 3M Company. The light redirecting film included a plurality of linear prisms with a 24 micron pitch and a prism peak or apex angle of about 90 degrees. The coating was done using the method described in Example F except that the syringe-pump rate was 6.5 cc/min and the current to the LEDs was 13 Amps, resulting in a UV-A dose of 0.1352 joules per square cm. FIG. 17 is an optical micrograph of a cross-section of the resulting optical construction showing optical film 1710 coated on light redirecting film 1720. Optical film 1710 had a refractive index of about 1.18, and an estimated optical haze of less than about 2%. The thickness of the optical film as measured from the prism valleys (distance $t_2$ in FIG. 17) was about 19.5 microns. The thickness of the optical film as measured from the prism peaks (distance $t_3$ in FIG. 17) was about 10.8 microns. Optical film 1720 planarized prism film 1720. Optical film 1720 includes a plurality of elongated particles and a plurality of voids. In some cases, the optical film has an index of refraction that is not greater than about 1.3, or not greater than about 1.25, or not greater than about 1.2, or not greater than about 1.15, or not greater than about 1.1. In some cases, the optical film has a thickness that is not less than about 5 microns, or not less than about 10 microns, or not less than about 15 microns.

In some cases, the optical film can have a thickness that is not less than about 10 microns and an optical haze that is not greater than about 2%, or not greater than about 1.5%, or not greater than about 1%.

The optical construction in FIG. 17 includes a structured surface 1730. The structured surface includes a plurality of structures 1740, where the height of the structures $t_4$ is about 12 microns. In some cases, the height of at least some of structures 1740 is not less than about 5 microns, or not less than about 7 microns, or not less than about 10 microns, or not less than about 15 microns, or not less than about 20 microns.

Optical film 1710 is coated on structured surface 1730 and planarizes the structured surface, meaning that top surface 1750 is substantially planar. For example, in such cases, the difference between the maximum and minimum heights of top surface 1750 as measured from a common reference plane such as reference plane 1760, is not more than about 20%, or not more than about 15%, or not more than about 10%, or not more than about 5% of height $t_4$ of structures 1740.

EXAMPLE 15

First, a coating solution was made. In a 1 liter three-neck flask, equipped with a condenser and a thermometer, 400 grams of IPA-ST-UP organosilica elongated particles and 8 grams of deionized water were mixed under rapid stirring.

Next, 9.6 grams of Silquest A-174 silane was added to the flask. The resulting mixture was stirred for 10 minutes. The mixture was then kept at 81° C. for 12 hours. Next, the solution was allowed to cool down to room temperature. Next, about 200 grams of the solvent in the solution were removed using a rotary evaporator under a 40° C. waterbath, resulting in a 32.7% wt A-174-modified elongated silica clear dispersion in isopropyl alcohol.

Next, 94.1 grams of this clear dispersion, 20.5 grams of SR 444, 1.3 grams of photoinitiator Irgacure 184, 39.2 grams of 1-methoxy-2-propanol, and 17 grams of isopropyl alcohol were mixed together and stirred resulting in a homogenous coating solution.

Next, this solution was coated on a 2 mil (0.051 mm) thick PET substrate 610 using the coating method described in Example F except that the current to the LEDs was 13 Amps, resulting in a UV-A dose of 0.1352 joules per square cm. The resulting optical film 630 had a total optical transmittance of about 95.7%, an optical haze of 1.8%, an optical clarity of 100%, a refractive index of about 1.16, and a thickness of about 9 microns.

In some cases, a porous optical film disclosed herein has an optical haze that is not less than about 80%, or not less than about 85%, or not less than about 90%, or not less than about 95%, and an optical clarity that is not less than about 80%, or not less than about 85%, or not less than about 90%, or not less than about 95%. In such cases, the pore size of a substantial fraction of the voids in the optical film, such as not less than about 50%, or not less than about 60%, or not less than about 70%, or not less than about 80%, of the voids in the optical film, is in a range from about 50 nm to about 1200 nm, or in a range from about 100 nm to about 1100 nm.

In some cases, an optical film disclosed herein has an optical haze that is not less than about 80%, or not less than about 85%, or not less than about 90%, or not less than about 95%, and an optical clarity that is not greater than about 20%, or not greater than about 15%, or not greater than about 10%, or not greater than about 5%. In such cases, the pore size of a substantial fraction of the voids in the optical film, such as not less than about 50%, or not less than about 60%, or not less than about 70%, or not less than about 80%, of the voids in the optical film, is in a range from about 150 nm to about 3000 nm, or in a range from about 200 nm to about 2500 nm.

As used herein, terms such as "vertical", "horizontal", "above", "below", "left", "right", "upper" and "lower", "clockwise" and "counter clockwise" and other similar terms, refer to relative positions as shown in the figures. In general, a physical embodiment can have a different orientation, and in that case, the terms are intended to refer to relative positions modified to the actual orientation of the device. For example, even if the image in FIG. 16A is flipped as compared to the orientation in the figure, the exposed surface of the optical film is still considered to be a "top" major surface.

All patents, patent applications, and other publications cited above are incorporated by reference into this document as if reproduced in full. While specific examples of the invention are described in detail above to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

What is claimed is:

1. An optical film comprising:
   a low effective index layer having two major surfaces and comprising:
   a binder;
   a plurality of particles; and
   a plurality of interconnected voids comprising surface voids at a major surface of the low effective index layer and interior voids within the interior of the low effective index layer, wherein:
   a volume fraction of the plurality of interconnected voids in the optical film is not less than about 20%, and wherein:
   a weight ratio of the binder to the plurality of the particles is not less than about 1:2, and
   wherein the low effective index layer has a thickness that is not less than about 1 micron.

2. The optical film of claim 1, wherein at least some of the plurality of particles comprise reactive groups that are chemically bound to the binder.

3. The optical film of claim 1, wherein at least some of the plurality of particles do not comprise reactive groups.

4. The optical film of claim 1, wherein the plurality of particles has an average size that is not greater than about 2 microns.

5. The optical film of claim 1, wherein the plurality of particles has an average size that is not greater than about 1 micron.

6. The optical film of claim 1, wherein the plurality of particles comprises elongated or spherical particles.

7. The optical film of claim 1, wherein the plurality of the interconnected voids has an average void size that is not greater than about 2 microns.

8. The optical film of claim 1, wherein the plurality of the interconnected voids has an average void size that is not greater than about 1 micron.

9. The optical film of claim 1, wherein the plurality of the interconnected voids has an average void size that is not greater than about 0.7 microns.

10. The optical film of claim 1, wherein the volume fraction of the plurality of interconnected voids in the low effective index layer is not less than about 30%.

11. The optical film of claim 1, wherein the volume fraction of the plurality of interconnected voids in the low effective index layer is not less than about 50%.

12. The optical film of claim 1, wherein the weight ratio of the binder to the plurality of the particles is not less than about 1:1.

13. The optical film of claim 1, wherein the weight ratio of the binder to the plurality of the particles is not less than about 2:1.

14. The optical film of claim 1, wherein an effective index of the optical film is not greater than about 1.35.

15. The optical film of claim 1, wherein an effective index of the optical film is not greater than about 1.25.

16. The optical film of claim 1, wherein an effective index of the optical film is not greater than about 1.2.

17. The optical film of claim 1, wherein an effective index of the optical film is not greater than about 1.15.

18. The optical film of claim 1 having an optical haze that is not greater than about 5%.

19. The optical film of claim 1 having an optical haze that is not greater than about 2%.

20. The optical film of claim 1 having an optical haze that is not greater than about 1%.

21. The optical film of claim 1 having an optical haze that is not less than about 50%.

22. The optical film of claim 1 having an optical haze that is not less than about 70%.

23. The optical film of claim 1 having an optical haze that is not less than about 80%.

24. The optical film of claim 1 having an optical haze that is not less than about 90%.

25. The optical film of claim 1 having an optical clarity that is not greater than about 10%.

26. The optical film of claim 1 having an optical clarity that is not greater than about 5%.

27. The optical film of claim 1 having an optical clarity that is not greater than about 2%.

28. The optical film of claim 1 having an optical clarity that is not less than about 50%.

29. The optical film of claim 1 having an optical clarity that is not less than about 70%.

30. The optical film of claim 1 having an optical clarity that is not less than about 90%.

31. The optical film of claim 1 having a diffuse optical reflectance that is not less than about 30%.

32. The optical film of claim 1 having a diffuse optical reflectance that is not less than about 40%.

33. The optical film of claim 1 having a diffuse optical reflectance that is not less than about 50%.

34. The optical film of claim 1 wherein the low effective index layer has a thickness that is not less than about 2 microns.

35. An optical construction comprising:
a substrate; and
the optical film of claim 1 disposed on the substrate.

36. The optical construction of claim 35, wherein the substrate comprises a release liner.

37. The optical construction of claim 35 further comprising an optical adhesive layer disposed on the optical film of claim 1.

38. The optical construction of claim 35 further comprising an optical adhesive layer disposed between the substrate and the optical film of claim 1.

39. The optical film of claim 1 having an optical haze that is not less than about 80%, wherein light scattered by the optical for normally incident light has a luminance $L_1$ at zero degrees and a luminance $L_2$ at 10 degrees, $L_1/L_2$ not being less than about 10.

40. The optical film of claim 39, wherein the optical film has an optical haze that is not less than about 90%.

41. The optical film of claim 39, wherein $L_1/L_2$ is not less than about 20.

42. The optical film of claim 39, wherein $L_1/L_2$ is not less than about 50.

43. The optical film of claim 39, wherein $L_1/L_2$ is not less than about 100.

44. The optical film of claim 1, wherein the interior voids are connected to a major surface via other voids.

45. An optical film comprising:
a low effective index layer having two major surfaces and comprising:
a binder;
a plurality of elongated particles; and
a plurality of interconnected voids comprising surface voids at a major surface of the low effective index layer and interior voids within the interior of the low effective index layer, wherein:
a volume fraction of the plurality of interconnected voids in the low effective index layer is not less than about 20%,
a thickness of the portion of the low effective index layer is not less than about 1 micron, and wherein:
an optical haze of the optical film is not greater than about 1.5%.

46. The optical film of claim 45, wherein the elongated particles in the plurality of elongated particles have an average aspect ratio that is not less than about 2.

47. The optical film of claim 45, wherein the elongated particles in the plurality of elongated particles have an average aspect ratio that is not less than about 3.

48. The optical film of claim 45, wherein the elongated particles in the plurality of elongated particles have an average aspect ratio that is not less than about 4.

49. The optical film of claim 45, wherein the volume fraction of the plurality of interconnected voids in the low effective index layer is not less than about 40%.

50. The optical film of claim 45, wherein the volume fraction of the plurality of interconnected voids in the low effective index layer is not less than about 60%.

51. The optical film of claim 45, wherein the thickness of the low effective index layer is not less than about 1.5 microns.

52. The optical film of claim 45, wherein the thickness of the portion of the optical film having the plurality of voids is not less than about 2 microns.

53. The optical film of claim 45, wherein the thickness of the low effective index layer is not less than about 2.5 microns.

54. The optical film of claim 45, wherein the optical haze of the optical film is not greater than about 1%.

55. The optical film of claim 45 having an effective index of refraction that is not greater than about 1.3.

56. The optical film of claim 45 having an effective index of refraction that is not greater than about 1.25.

57. The optical film of claim 45 having an effective index of refraction that is not greater than about 1.2.

58. The optical film of claim 45, wherein the voids in the plurality of the interconnected voids have an average size that is not greater than about 50 nm.

59. The optical film of claim 45, wherein the interior voids are connected to a major surface via other voids.

60. An optical film comprising a low effective index layer having two major surfaces and comprising a plurality of particles coated and interconnected by a binder, the interconnected plurality of particles defining a plurality of interconnected voids comprising surface voids at a major surface of the low effective index layer and interior voids within the interior of the low effective index layer, the interior voids having an average size that is in a range from about 100 nm to about 300 nm, wherein the optical film has:
a thickness of the low effective index layer that is not less than about 1 micron;
an optical haze that is in a range from about 20% to about 70%; and
an optical clarity that is not less than about 80%.

61. The optical film of claim 60 having an optical clarity that is not less than about 90%.

62. The optical film of claim 60 having an optical clarity that is not less than about 95%.

63. The optical film of claim 60, wherein the interior voids are connected to a major surface via other voids.

64. An optical film comprising:
a low effective index layer having two major surfaces comprising:
a plurality of elongated particles; and
a plurality of voids comprising surface voids at a major surface of the low effective index layer and interior voids within the interior of the low effective index layer, wherein, the optical film has:

an index of refraction that is not greater than about 1.3;
a thickness of the low effective index layer that is not less than about 5 microns; and
an optical haze that is not greater than about 2%.

65. The optical film of claim 64, wherein the optical film has an index of refraction that is not greater than about 1.2.

66. The optical film of claim 64, wherein the low effective index layer has a thickness that is not less than about 10 microns.

67. The optical film of claim 64, wherein the low effective index layer has a thickness that is not less than about 15 microns.

68. The optical film of claim 64, wherein the interior voids are connected to a major surface via other voids.

69. An optical construction comprising:
a structured surface comprising a plurality of structures, at least some of the structures having a height that is not less than about 10 microns; and
an optical film comprising low effective index layer having two major surfaces and comprising a plurality of elongated particles and a plurality of voids comprising surface voids at a major surface of the low effective index layer and interior voids within the interior of the low effective index layer, the optical film coated on and substantially planarizing the structured surface, wherein the low effective index layer has a thickness that is not less than about 1 micron, the optical film comprising:
an index that is not greater than about 1.2; and
an optical haze that is not greater than about 2%.

70. The optical film of claim 69, wherein the interior voids are connected to a major surface via other voids.

* * * * *

UNITED STATES PATENT AND TRADEMARK OFFICE
CERTIFICATE OF CORRECTION

Page 1 of 2

PATENT NO. : 10,539,722 B2
APPLICATION NO. : 13/264325
DATED : January 21, 2020
INVENTOR(S) : Encai Hao It is certified that error appears in the above-identified patent and that said Letters Patent is hereby corrected as shown below:

On the Title Page

Page 2, Column 2 (Other Publications),
Line 6, delete "Electrochromotography"," and insert -- Electrochromatography", --, therefor.

Page 3, Column 1 (Other Publications),
Line 22, delete "chromoatography" and insert -- chromatography --, therefor.
Line 23, delete "Choromatography," and insert -- Chromatography, --, therefor.
Line 25, delete "chromoatography." and insert -- chromatography. --, therefor.
Line 26, delete "Choromatography," and insert -- Chromatography, --, therefor.
Line 31, delete "macroorous" and insert -- macroporous --, therefor.

Page 3, Column 2 (Other Publications),
Line 26, delete "Nanovioided" and insert -- Nanovoided --, therefor.

In the Specification

Column 2,
Line 51-52, delete "In some cases, the optical film has a thickness that is greater than about 1 micron, or greater than about 2 microns." and insert the same on Column 2, Line 50 as a continuation of the same paragraph.

Column 5,
Line 67, delete "+(1-f)$n_b$" and insert -- "+(1-f)$n_b^2$ --, therefor.

Column 9,
Line 17-29, delete "In some cases, optical film 300 has a high optical clarity. For light normally incident on optical film 300, optical clarity, as used herein, refers to the ratio $(T_1-T_2)/(T_1+T_2)$, where $T_1$ is the transmitted light that deviates from the normal direction between 1.6 and 2 degrees, and $T_2$ is the transmitted light Signed and Sealed this
Eleventh Day of May, 2021

Drew Hirshfeld
*Performing the Functions and Duties of the
Under Secretary of Commerce for Intellectual Property and
Director of the United States Patent and Trademark Office* that lies between zero and 0.7degrees from the normal direction. Clarity values disclosed herein were measured using a Haze-Gard Plus haze meter from BYK-Gardiner. In the cases where optical film 300 has a high optical clarity, the clarity is not less than about 40%, or not less than about 50%, or not less than about 60%, or not less than about 70%, or not less than about 80%, or not less than about 90%, or not less than about 95%." and insert the same on Column 9, Line 18 as a new paragraph.
Line 22, delete "0.7degrees" and insert -- 0.7 degrees --, therefor.

Column 11,
Line 51-52, delete "terapthalate" and insert -- terephthalate --, therefor.

Column 13,
Line 17, delete "Pentaerthritol" and insert -- Pentaerythritol --, therefor.

Column 15,
Line 9, after "sinks" insert -- . --.

Column 19,
Line 51, delete "trimethypentyl)" and insert -- trimethylpentyl) --, therefor.
Line 60, delete "Irgcure 819," and insert -- Irgacure 819, --, therefor.
Line 60, delete "Irgcure" and insert -- Irgacure --, therefor.